(12) United States Patent
Thompson

(10) Patent No.: US 6,804,063 B2
(45) Date of Patent: Oct. 12, 2004

(54) OPTICAL INTERFERENCE FILTER HAVING PARALLEL PHASE CONTROL ELEMENTS

(75) Inventor: James Tristan Thompson, Longmont, CO (US)

(73) Assignee: Research Electro-Optics, Inc., Boulder, CO (US)

( * ) Notice: Subject to any disclaimer, the term of this patent is extended or adjusted under 35 U.S.C. 154(b) by 17 days.

(21) Appl. No.: 10/280,149

(22) Filed: Oct. 25, 2002

(65) Prior Publication Data

US 2004/0080834 A1 Apr. 29, 2004

(51) Int. Cl.[7] ............................................. G02B 27/14
(52) U.S. Cl. ..................... 359/629; 359/637; 359/638; 356/450; 356/491
(58) Field of Search ................................. 359/618, 619, 359/629, 630, 633, 634, 636–638; 356/450, 453, 454, 505, 506, 519, 491, 493

(56) References Cited

U.S. PATENT DOCUMENTS

| | | | |
|---|---|---|---|
| 4,204,771 A | 5/1980 | Shull et al. | 356/346 |
| 4,756,602 A | 7/1988 | Southwell et al. | 350/166 |
| 4,813,756 A | 3/1989 | Frenkel et al. | 350/96.18 |
| 5,037,180 A | 8/1991 | Stone | 385/123 |
| 5,212,584 A | 5/1993 | Chung | 359/260 |
| 5,291,332 A | 3/1994 | Siebert | 359/589 |
| 5,400,179 A | 3/1995 | Ito | 359/588 |
| 5,781,268 A | 7/1998 | Liu et al. | 349/198 |
| 5,798,859 A | 8/1998 | Colbourne et al. | 359/247 |
| 5,828,689 A | 10/1998 | Epworth | 372/98 |
| 5,926,317 A | 7/1999 | Cushing | 359/588 |
| 5,999,320 A | 12/1999 | Shirasaki | 359/577 |
| 6,005,995 A | 12/1999 | Chen et al. | 385/24 |
| 6,154,318 A | 11/2000 | Austin et al. | 359/584 |
| 6,169,604 B1 | 1/2001 | Cao | 356/519 |
| 6,169,626 B1 | 1/2001 | Chen et al. | 359/279 |
| 6,186,937 B1 | 2/2001 | Ackerman et al. | 506/352 |

(List continued on next page.)

FOREIGN PATENT DOCUMENTS

| | | | |
|---|---|---|---|
| EP | 1 098 212 A1 | 5/2001 | G02B/6/293 |
| WO | WO/00/25154 | 5/2000 | G02B/5/08 |

OTHER PUBLICATIONS

U.S. patent application Ser. No. 10/150,001, Ducellier et al., filed Dec. 5, 2002.
U.S. patent application Ser. No. 10/058,534, Copner et al., filed Nov. 21, 2002.
U.S. patent application Ser. No. 09/765,544, Jeong et al., filed Sep. 12, 2002.
Dingel, BB et al. (1998), "Multifunction Optical Filter with a Michelson–Gires–Tournois Interferometer for Wavelength–Division–Multiplexed Network System Applications;" Optics Letters 23(14):1099–1101.

(List continued on next page.)

Primary Examiner—Huy Mai
(74) Attorney, Agent, or Firm—Greenlee, Winner and Sullivan, P.C.

(57) ABSTRACT

The invention relates generally to optical interference filters and interferometers. Methods, devices and device components are presented for separating closely spaced optical channels with minimized cross talk. The invention provides optical interference filters having parallel phase control elements which efficiently transmit light of a selected optical channel or a plurality of selected channels with decreased light loss, particularly decreased insertion loss. An exemplary interference filter of the present invention provides minimized vertical and horizontal recombination error and improved optical path length matching. The invention further provides methods of fabricating optical interference filters with improved piece-to-piece reproducibility. The methods, devices and device components provided herein are particularly well-suited for combining or separating closely spaced optical signals corresponding to transmission channels of a selected frequency standard, such as the International Telecommunication Union frequency standard.

52 Claims, 9 Drawing Sheets

U.S. PATENT DOCUMENTS

| | | | |
|---|---|---|---|
| 6,201,907 B1 | 3/2001 | Farries | 385/24 |
| 6,208,444 B1 | 3/2001 | Wong et al. | 359/127 |
| 6,222,673 B1 | 4/2001 | Austin et al. | 359/584 |
| 6,241,397 B1 | 6/2001 | Bao et al. | 385/73 |
| 6,249,350 B1 * | 6/2001 | Dultz et al. | 356/491 |
| 6,252,716 B1 | 6/2001 | Paiam | 359/618 |
| 6,263,128 B1 | 7/2001 | Huang | 385/24 |
| 6,268,951 B1 | 7/2001 | Chen et al. | 359/279 |
| 6,275,322 B1 | 8/2001 | Tai | 359/279 |
| 6,304,689 B1 | 10/2001 | Dingel et al. | 385/24 |
| 6,317,251 B1 | 11/2001 | Wang | 359/318 |
| 6,320,663 B1 | 11/2001 | Ershov | 356/454 |
| 6,373,620 B1 | 4/2002 | Wang | 359/315 |
| 6,379,984 B1 | 4/2002 | Sandberg et al. | 438/29 |
| 6,386,718 B1 | 5/2002 | Qian | 359/879 |
| 6,570,711 B2 * | 5/2003 | Ducellier | 359/629 |
| 2002/0154314 A1 * | 10/2002 | Copner et al. | 356/450 |
| 2002/0180981 A1 * | 12/2002 | Ducellier et al. | 356/491 |

OTHER PUBLICATIONS

Hect (1987) "The Fabry–Perot Interferometer" Optics, 2nd Ed., Addison–Wesley Publishing Co., pp. 368–372.

Karow, HH (1993), "Fabrication Methods for Precision Optics;" John Wiley & Sons pp. 35–51, 442–462, 560–563, 644–671 and 714–721.

Moore et al. (1989) "Building Scientific Apparatus," Optics, Addison–Wesley Publishing Co., pp. 242–251.

* cited by examiner

PRIOR ART

OPTICAL INTERFERENCE FILTER HAVING PARALLEL PHASE CONTROL ELEMENTS

FIELD OF INVENTION

This invention relates generally to optical interferometry. In particular, the invention relates to methods, devices and device components employing interferometers and optical interference filters for processing optical signals. Optical interleavers having parallel phase control elements are described, which are particularly useful for wavelength division multiplexing and demultiplexing applications.

BACKGROUND OF INVENTION

Optical telecommunication systems are capable of efficient and accurate signaling at extremely high rates ranging several mega-bits per second to several tens of giga-bits per second. In addition, optical signaling techniques have significant advantages over non-optical communication methods, such as coaxial cable, copper wire and microwave transmission techniques, which include lower propagation loss, higher channeling capacity and insusceptibility to electromagnetic interference. As a result of these benefits, optical communication systems are prevalent in nearly all existing telecommunication networks and a great deal of research has been directed at developing purely optical telecommunications systems.

As worldwide telecommunications usage continues to expand, the need for greater data-carrying capacity has made potential gains in channeling capacity via optical telecommunications methods especially attractive. To provide additional data-carrying capacity without requiring new optical fiber transmission lines, coarse wavelength division multiplexing and dense wavelength division multiplexing techniques have developed over the last decade. Wavelength division multiplexing is used to increase the transmission capacity of fiber optic communication systems by allowing multiple wavelengths to be transmitted and received over a single optical fiber. In wavelength division multiplexing, a plurality of optical signals of different wavelength are multiplexed by coupling each signal to a common transmission line. The multiplexed transmission signal is then propagated over a single optical medium to a variety of receivers. When received, the multiplexed transmission signal is demultiplexed into discrete channels corresponding to individual wavelengths and detected by a receiver. Typically, signal demultiplexing is achieved by a variety of wavelength selective optical filtering devices including optical interference filters, birefringent filters, cutoff filters, prisms, diffraction gratings and fiber optic devices. Although wavelength division multiplexing provides a simple, effective and inexpensive way of increasing transmission capacity, the number of channels employable over a given wavelength domain is limited by cross talk between transmission channels. Cross talk refers to incomplete separation of selected and non-selected optical channels such that light corresponding to one or more non-selected optical channels remains in combination with a selected channel and is detected. As understood by those skilled in the art, cross talk degrades the overall efficiency and accuracy of an optical communication system and substantially limits the narrowest channel spacing achievable. Accordingly, the feasibility of wavelength division multiplexing technology is dependent on the development of high resolution, high throughput optical filters.

Adoption of universal standard transmission channels for fiber optic transmission promotes efficient application of wavelength division multiplexing. The International Telecommunication Union (ITU) has adopted a standard channel definition providing a 45 channel system over a wavelength range of 1520 nm to 1565 nm with a uniform channel spacing of 100 GHz (approximately 0.8 nm). The universal standard of telecommunication transmitting frequencies ensures intercompatibility of optical telecommunications systems and promotes realization of the full benefits of wavelength division multiplexing. As conventional thin film dielectric filters are not capable of efficiently and accurately separating the closely spaced transmission channels of the ITU frequency standard, an immediate need exists for more precise demultiplexing optical devices capable of high resolution, high throughout optical filtering.

Improvements in wavelength division multiplexing technology have focused on development of (1) optical devices capable of combining multiple optical signals corresponding to different transmission wavelengths or optical channels into a single fiber and (2) optical devices capable of separating multiplexed optical signals comprising of a plurality of data streams into discrete optical signals corresponding to selected transmission wavelengths or optical channels. In addition, these efforts have focused on developing optical signaling technology capable of supporting the use of more closely spaced transmission channels. One method of achieving these goals involves the development of optical interleavers suitable for multiplexing and demultiplexing optical signals. Interleavers provide multiplexer functionality by combining two or more streams of optical signals into a single, plural optical signal stream and provide demultiplexer functionality by separating a plural optical signal stream into individual optical signal stream components, typically corresponding to odd and even transmission channels. Four primary types of interleaver devices have emerged over the last several years: (1) interferometric optical interleavers, (2) dielectric thin film and birefringent filters, (3) planar wave guides and (4) fiber-based devices. Interferometric optical interleavers are especially promising for wavelength division multiplexing applications because of their low cost, wide free spectral range and fiber compatibility.

Interferometric optical interleavers are devices that replace at least one of the reflecting mirrors of a dual beam interferometer with a Gires-Tournois etalon (GT etalon). Over the last several years, interferometric optical interleavers have proven very useful in a variety of multiplexing and demultiplexing applications. Interferometric optical interleavers and deinterleavers operate by multiple-beam optical interference generated by the separation of an incident light beam into two sub-components that separately undergo phase modification, are coherently recombined and undergo constructive or destructive optical interference. FIG. 1 illustrates an interferometric optical interleaver (10) of the prior art comprising a cube-type beam splitter (15) in optical communication with a GT etalon (20) and an air gap phase control element (25), which are positioned along orthogonal axes with respect to each other. During operation, an incident beam (27) is directed onto the beam splitter (15), which separates the incident beam into first beam component (30) and second beam components (35), propagating on axes that are orthogonal to one another. The first component is directed through an air gap phase control element (25) and is reflected back toward the cube-type beam splitter by an external reflector. The second component is directed onto a GT etalon (20) wherein it is further separated into a plurality of sub-beams by a partially reflective internal reflector and a highly reflective external reflector. First and second beam components are coherently combined at the cube-type beam splitter and undergo optical interference. The nature and extent of the optical interference experienced depends on the optical paths of each beam component and the reflectivities of the reflectors comprising the GT etalon and air gap phase control element. As a result of optical interference, only certain frequencies of light are transmitted through the interleaver as output beams (40) corresponding to the transmission bands of the optical filter. By selection of the appropriate optical path length difference for reflected and transmitted beam components, interferometric interleavers of the prior art are capable of providing transmission spectra comprising periodic, substantially square-wave transmission bands.

U.S. Pat. No. 6,304,689 discloses a multifunctional optical filter capable of functioning as an optical interleaver. The optical filter described comprises a Michelson interferometer or Tynman-Green interferometer having a GT etalon substituted for one of the reflecting mirrors. Specifically, the patent discloses an orthogonal interferometer geometry employing a cube-type central beam splitter in optical communication with a GT etalon and reflective surface positioned along axes that are perpendicular to each other. The disclosed orthogonal optical filter design is reported to provide a substantially, square-wave transmission spectrum with selectable free spectral range, useful for minimizing cross talk during signal demultiplexing.

Although the optical filters in U.S. Pat. No. 6,304,689 are reported to provide spectral characteristics beneficial for multiplexing and demultiplexing applications, the disclosed design is susceptible to substantial problems arising from structural limitations inherent to fabrication of devices employing an orthogonal interferometer geometry. Conventional methods of fabricating optical devices, including optical arrangements having an orthogonal orientation, are extensively described in Moore et al. in "Building Scientific Apparatus", Addison—Wesley Publishing Co, 1989, pgs 119–256 and Fabrication Methods for Precision Optics, Hank H. Karow, John Wiley & Sons, 1993, pgs. 35–51, 442–462, 560–563, 644–671 and 714–721. First, the orthogonal arrangement of the prior art is susceptible to optical path length mismatch between the two legs of the Michelson or Tyman-Green interferometer. Optical path length mismatch is a deviation from the selected optical path lengths through each leg of the interferometer, which is introduced by fabrication errors. Mismatch errors result in substantial aberrations in the frequency, bandwidth and shape of the transmission bands because it is the selected difference in the optical path lengths of first and second beam components that establishes the net optical interference resulting upon beam recombination. Specifically, optical path length mismatch leads to substantial deviations from the desired square-wave shaped transmission bands of optical interleavers, which reduces light throughput and increases cross talk. Minimizing optical path length variation, therefore, is a vital factor in achieving a manufacturable optical interleaver design that is capable of providing square-wave transmission bands at precise, selected frequencies. Indeed, the piece-to-piece optical path length variation observed in optical filters having an orthogonal interferometer arrangement necessitates the use of optical path length compensation schemes, which add considerably to the complexity and cost of prior art interleavers.

Second, the optical configuration disclosed in U.S. Pat. No. 6,304,689 is also vulnerable to angular mismatch in the combination of the first and second beam components corresponding to each leg of the interferometer. This sensitivity arises from deviations in the relative positions of the cube-type beam splitter and each orthogonal leg of the interferometer, namely pyramidal error. In addition, susceptibility to angular mismatch derives from difficulties in fabricating a beam splitter in which the partially reflective surface is positioned at an angle precisely 45 degrees from the internal ends of each orthogonal leg of the interferometer. Angular mismatch causes poor vertical and horizontal beam recombination, which results in a substantial degradation in interleaver performance. Specifically, angular mismatch leads to high insertion loss, which decreases transmission of light having frequencies corresponding to the transmission bands and increases unwanted transmission of light having frequencies outside the transmission bands. High insertion loss, therefore, results in poor light throughput and increased cross talk.

U.S. Pat. No. 6,252,716 discloses a bulk optical interleaver comprising a Michelson interferometer in which both reflecting mirrors are replaced by GT etalons. Although the dual GT etalon interleaver design is reported to provide improved transmission and channel stability with respect to temperature variations, the design employs an orthogonal interferometer geometry highly susceptible optical path length mismatch and poor angular recombination.

U.S. Pat. No. 6,169,626 discloses an interleaver comprising a Michelson interferometer in which the first reflecting mirror is replaced by a GT etalon and the second reflecting mirror is replaced by a nonlinear phase control element. The disclosed interleaver design is reported to provide a means of upgrading a broader channel scheme into a narrower one. The optical arrangements described, however, are limited to orthogonal interferometer geometries, which are susceptible to optical path length mismatch and poor angular recombination.

U.S. Pat. Nos. 6,725,322 and 6,386,718 provides methods and device components for adjusting the optical path lengths of first and second beam components in interferometric optical interleavers having an orthogonal interferometer geometry. U.S. Pat. No. 6,725,322 describes the use of a tilt plate located in an air gap cavity for varying the optical path length through the air gap cavity. U.S. Pat. No. 6,386,718 provides air gap cavities having selectably adjustable cavity gas pressure and composition, which are capable of varying the effective optical thickness. While the methods and device components described in U.S. Pat. Nos. 6,725,322 and 6,386,718 are reported to provide methods of compensating for fabrication related optical path length variations, the designs add substantially to the complexity, cost and difficulty of fabrication of interferometric optical interleavers.

It will be appreciated from the foregoing that a need exists for high throughput optical interleavers capable of substantially minimizing cross talk. Particularly, interleavers having substantially square-wave transmission bands, which do not exhibit high insertion loss are needed. Accordingly, it is an object of the present invention to provide methods, devices and device components capable of efficiently combining or separating closely spaced optical channels with reduced cross talk. The present invention provides improved high throughput, low cost optical interleavers with selectably adjustable free spectral range. In addition, optical interleaver designs are presented that drastically improve the ease of fabrication and achieve greater piece-to-piece reproducibility. Further, the present invention provides optical interference filters that provide improved light throughput and decreased cross talk without the need of costly optical path length compensation schemes.

SUMMARY OF THE INVENTION

This invention provides methods, devices, and device components for improving frequency discrimination and optical signal processing using optical interference filters and interferometers. In particular, the invention relates to methods, devices and device components for separating closely spaced optical channels with minimized cross talk. The invention provides optical interference filters that exhibit efficient transmission of light of selected optical channels with decreased light loss, particularly decreased insertion loss. The present invention includes tunable and fixed frequency optical interference filters. In addition, optical interferometers and optical interference filters are provided with minimized vertical and horizontal recombination errors and improved optical path length matching. More specifically, this invention provides optical interference filters and interferometers having spatially parallel phase control elements that are easily fabricated with high piece-to-piece reproducibility. Also provided are methods of fabricating optical interference filters and interferometers having parallel phase control elements.

In a preferred embodiment, the present invention comprises an optical interference filter having substantially parallel phase control elements capable of functioning as an optical interleaver. Specifically, optical interference filters and interleavers of the present invention are capable of (1) combining separate optical channel streams into a single, more dense, plural channel optical stream, (2) separating a plural channel optical stream into a plurality of less dense component optical streams, and (3) functioning as a channel dropping filter, channel passing filter or a band pass filter. Optical interference filters and interleavers of the present invention are capable of providing substantially square-wave transmission spectra with selectably adjustable free spectral range and resonance frequencies. In a preferred embodiment, an optical interleaver of the present invention is capable of providing periodic, substantially square-wave transmission bands over the wavelength range of about 1520 nm and 1630 nm. The square-wave transmission spectra of the optical interference filters of the present invention are particularly well suited for multiplexing or demultiplexing optical data streams corresponding to the transmission channels of a selected frequency standard, such as the ITU frequency standard.

An exemplary optical interference filter comprises a beam splitter for separating an incident beam into a first beam component and a second beam component, a first phase control element in optical communication with the beam splitter for receiving the first beam component, and a second phase control element in optical communication with the beam splitter for receiving the second beam component. The first phase control element has a transparent internal end positioned a selected optical path length from the beam splitter and further comprises a first external reflector. The second phase control element has a transparent internal end, positioned a selected optical path length from the beam splitter, and further comprises a second external reflector. In a preferred embodiment, the optical interference filter has a parallel interferometer geometry wherein the internal end of the first phase control element and the internal end of the second phase control element are located in substantially parallel planes with respect to each other. In an alternative preferred embodiment, the internal end of the first phase control element and the internal end of the second phase control element are located in substantially the same plane.

First and second external reflectors of the present invention are at least partially reflective and, preferably, are highly reflective having a reflectivity selected from the range of about 80% to about 100%. In a preferred embodiment, first and second external reflectors reflect substantially all of the first and second beam components, respectively. Highly reflective external reflectors are beneficial because they provide for substantially complete optical interference of first and second beam components. Substantially complete optical interference results in optical filters capable of efficient transmission of light with frequencies corresponding to a selected transmission channel or series of transmission channels. Further, substantially complete optical interference results in optical interference filters capable of preventing substantially all transmission of light having frequencies outside of a selected transmission channel or series of transmission channels, thereby, minimizing cross talk.

During operation, an incident optical beam is directed onto the beam splitter, which separates the incident beam into a first beam component and a second beam component. The first beam component is directed onto the first phase control element, undergoes a modification of its phase and is reflected by the first external reflector back to the beam splitter. The second beam component is directed onto the second phase control element, undergoes a modification of its phase and is reflected by the second external reflector back to the beam splitter. Phase modification can be achieved by first or second beam components propagating a selected optical path length or by separation of first or second beam components into a plurality of subcomponents which may undergo optical interference. The present invention includes other methods of phase modification well known in the art of optical interference. The first beam component and the second beam component are coherently combined at the beam splitter and undergo optical interference. The nature and extent of the optical interference varies with frequency and is dependent on the phase modification of first and second beam components by the first and second phase control elements. In a preferred embodiment, the beam splitter separates the incident beam into substantially equal first and second beam components, which undergo substantially complete reflection at first and second external reflectors, respectively. In an exemplary embodiment wherein the first phase control element is an air gap phase control element and second phase control element is a GT etalon, the first beam and second beam undergo constructive and deconstructive interference in a manner providing a transmission spectrum comprising periodic, substantially square-wave transmission bands with selectably adjustable free spectral range.

The parallel interferometer orientation of the present invention is beneficial because it allows for greater precision in the manufacture of optical interference filters and interferometers using conventional fabrication methods. First, the parallel interferometer design of the present invention provides an order of magnitude improvement in the observed piece-to-piece variation in the selected optical path length difference between the first and second beam components. For example, when manufactured using standard fabrication methods, optical interference filters of the present invention achieve a variation in the selected optical path length difference between the first and second beam components that is less than 0.3 $\mu$m. This is a substantial improvement over the variation in the selected optical path length differences observed in optical interference filters employing an orthogonal phase control element geometry, which is greater than or equal to 5 $\mu$m. The order of magnitude improvement in observed optical path length difference variation largely results from the ease of making optical surfaces that are substantially parallel, in contrast to making orthogonal optical assemblies. Minimizing piece-to-piece variation in selected optical path length difference provides optical interference filters with greater efficiency and lower insertion loss. Further, reducing piece-to-piece variation in selected optical path length difference to less than or equal to about 0.3 μm and avoids the need for costly optical path length compensation schemes. Specifically, the high precision attainable in the selected path length difference of the present invention results in optical interference filters having an insertion loss significantly less than optical interleavers of the prior art.

Second, the parallel interferometer design of the present invention provides a substantial improvement in the extent of angular recombination of first and second beam components achievable over interleaver designs employing an orthogonal phase control element geometry. Horizontal angular recombination errors arise from a mismatch of the optical angles which establish the optical paths of first and second beam components. Interleavers having an orthogonal interferometer orientation achieve optimal angular recombination of first and second beam components by precisely matching a first angle (element 50 in FIG. 1) defined by the plane containing the beam splitter and the plane containing the internal end of the first phase control element and a second angle (element 55 in FIG. 1) defined by the plane containing the beam splitter and the plane containing the internal end of the second phase control element. To achieve optimal recombination of first and second beam components these angle must be precisely 45 degrees. Structural limitations in fabricating orthogonal interferometer optical arrangements, however, result in substantial deviations in these angles of greater than 20 arcseconds.

The parallel interferometer optical arrangement of the present invention converts the problem of matching optical angles defined by two orthogonal planes to a process involving matching two angles that share a common defining axis. Specifically, horizontal recombination of first and second beam components in the optical geometry of the present invention is optimized by matching a first optical angle defined by the planes containing the partially reflective coating and the phase control elements or path length compensation element and a second optical angle defined by the planes containing a reflective surface parallel to the partially reflective coating and the phase control elements or path length compensation element. Because these angles share a common plane, they can be matched very precisely to within about 1 arcsecond using conventional fabrication processes, preferably double side lapping techniques. Accordingly, the interleaver design of the present invention is desirable because it is capable of efficient recombination of first and second beam components and, therefore, reduced angular recombination errors. Minimizing angular recombination distortion is beneficial because it decreases insertion loss and provides an output beam that can be efficiently coupled to an optical fiber with little loss of light.

Finally, the parallel interferometer design of the present invention provides optical interleavers, which may be fabricated more easily and with lower cost. Specifically, the interleaver design of the present invention may be fabricated by processes that are substantially less complicated and involve fewer fabrication steps than methods employed for manufacturing interleavers having an orthogonal interferometer orientation. The parallel interferometer design of the present invention reduces the number of independent variables relating to the position of phase control elements involved in interleaver fabrication. In contrast to prior art interleaver designs having two independent position variables corresponding to the location of two different planes defining the internal ends of orthogonal phase control elements, the present interleaver design involves a single position variable corresponding to the plane defining both internal ends of the parallel phase control elements or path length compensation elements. Decreasing the number of independent variables relating to the position of the phase control elements reduces the observed variations in optical path length through first and second phase control elements and decreases the overall design complexity of the optical path length-matching scheme.

In a preferred embodiment, the first phase control element, second phase control element or both are air gap phase control elements capable of selectively modifying the phase of the first beam component, the second beam component or both. Preferred air gap phase control elements of the present invention further comprise a front plate in optical communication with the beam splitter and located a selected optical path length from the beam splitter. The front plate and first or second external reflector are separated by an air gap of selected optical path length and, optionally, selected index of refraction. Preferably front plate and first or second external reflectors are located in substantially parallel planes with respect to each other. In a more preferred embodiment, the front plate, external reflector and the internal end of the phase control element are each located in substantially parallel planes with respect to each other. In an alternate preferred embodiment, the internal end of the phase control element is the front plate. Preferred air gap optical path lengths for a given angle of incidence are selected from the range of about 100 nm to about 20 mm.

In an exemplary embodiment, an air gap alignment spacer or a kinematic mounting system is provided to maintain a substantially constant or selectably adjustable optical path length through the air gap for a given angle of incidence. Use of an alignment spacer is beneficial because it provides optical filters with substantially constant, fixed transmission bands or selectably, adjustable transmission bands. Alignment spacers may comprise a low thermal expansion material, such as a ultra low expansion (ULE) material, to achieve a substantially constant and stable optical path length over the temperature range of about −40° C. to about 85° C. Alternatively, alignment spacers of the present invention may comprise a piezoelectric element and/or electrooptic modulator operationally coupled to the front plate and external reflector of the air gap phase control element. In this embodiment, the optical path length through the air gap is selectably adjustable by controlling the voltage applied to the piezoelectric element and/or electrooptic modulator. Air gap phase control elements with selectably adjustable optical path lengths are beneficial because they provide tunable optical filters having transmission bands with selectably adjustable frequencies, which are capable of precise frequency matching to transmission channels of a selected frequency standard, such as the ITU frequency standard.

The use of air gap phase control elements in the present invention is desirable because it provides optical interference filters and interleavers that are especially thermally stable. Thermal stability provides for very stable transmission characteristics, namely resonance frequencies and a free spectral range, that do not vary significantly over the temperature range of about −40° C. to about 85° C. In addition, air gap phase control elements are beneficial because they provide an air gap having a selectably adjustable refractive index. Specifically, the refractive index of the air gap may be selected by varying the partial pressure, identity or both of one or more gases in the air gap. In this embodiment, the air gap is equipped with a gas inlet capable of maintaining a substantially constant pressure of gases in the air gap. Selective variation of the refractive index of the air gap provides optical interference filters that are tunable.

In another exemplary embodiment, the first phase control element, second phase control element or both are dielectric phase control elements capable of selectively modifying the phase of the first beam component, second beam component or both. Preferred dielectric phase control elements of the present invention comprise at least one dielectric material, having an internal end and an external end, in optical communication with the beam splitter and positioned a selected optical path length from the beam splitter. Dielectric materials of the present invention have selected optical path lengths for a given angle of incidence, preferably selected from the range of about 100 nm to about 20 mm. In a preferred embodiment, the internal end and the external reflector are located in substantially parallel planes with respect to each other. In an alternative preferred embodiment, the internal end of the dielectric layer is the internal end of the phase control element. Dielectric phase control elements are beneficial because they provide a substantially constant optical path length from beam splitter to external reflector for a given angle of incidence. Use of low expansion materials for the dielectric material is preferred to achieve a substantially constant optical path length over the temperature range of about −40° C. to about 85° C.

In a preferred embodiment of the present invention, the first phase control element, the second phase control element or both are etalon optical filters capable of separating a beam component into a plurality of sub-beams and manipulating the phase of each sub-beam. A preferred etalon optical filter of the present invention comprises at least a partially reflective internal reflector located in a plane substantially parallel to the internal end of the first phase control element, second phase control element or both. In a preferred exemplary embodiment, the internal end of first phase control element, second phase control element or both are the partially reflective internal reflector. The partially reflective internal reflector and the first or second external reflector are located in substantially parallel planes with respect to each other and thereby form a resonance cavity having a selected optical path length between them. Preferred resonance cavity optical path lengths range from about 100 nm to about 10 mm.

In a preferred embodiment, the first phase control element, second phase control element or both are GT etalons having a highly reflective external reflector and a partially reflective internal reflector. Use of a GT etalon as a phase control element in the present invention is preferred because it is capable of reflecting substantially all of the first beam component, second beam component or both. Therefore, optical interference filters employing GT etalon phase control elements are capable of providing substantially complete optical interference. Optical interference filters providing substantially complete optical interference efficiently transmit light having frequencies corresponding to a selected transmission channel or series of transmission channels and substantially prevent transmission of light having frequencies outside of a selected transmission channel or series of transmission channels. Further, optical interference filters of the present invention comprising a first GT etalon phase control element and a second GT etalon phase control element provide interleavers with highly square-wave shaped, periodic transmission bands and improved chromatic dispersion characteristics. Improved chromatic dispersion characteristics refer to interference filters that exhibit reduced broadening of optical signals with respect to time due to dispersion.

In an exemplary embodiment, etalon resonance cavities of the present invention are composed of any dielectric material. In an exemplary embodiment, the resonance cavity is a dielectric cavity layer of a selected optical thickness and path length: Alternatively, an optical interference filter of the present invention comprises an air gap resonance cavity of selected optical path length, wherein the space between the partially reflective internal reflector and second external reflector is occupied by a selected pressure of one or more gases or by a substantial vacuum. Selection of the pressure and identity of gases in the resonance cavity establishes the refractive index of the resonance cavity. In this embodiment, an air gap alignment spacer or kinematic mounting system is desirable to maintain a substantially constant or selectably adjustable optical path length through the resonance cavity for a given angle of incidence. In addition, an exemplary embodiment includes a gas inlet operationally coupled to the air gap for the introducing of one or more gases to the air gap and maintaining a substantially constant pressure in the air gap resonance cavity. Air gap resonance cavities of the present invention are capable of achieving a substantially constant cavity pressure. Air gap resonance cavities are beneficial because they provide optical interference filters that are thermally stable.

For a given angle of incidence, etalon resonance cavities of the present invention may have a substantially fixed, selected optical path length or may have a selectably, variable optical path length. Resonance cavities with a fixed optical path length are beneficial because they are capable of providing a very stable optical path length for a given angle of incidence, and, thus provide very reproducible transmission spectra. Alternatively, selective variation in optical path length may be provided by alignment spacers comprising a piezoelectric crystal or electro-optical modulator operationally coupled to the etalon reflector pair. Resonance cavities with a variable optical path length are beneficial because they are capable of providing tunable transmission characteristics. Specifically, interference filters of the present invention with a variable optical path length resonance cavity are capable of selectably adjusting resonance frequencies and free spectral range by variation of the optical path length, refractive index of the etalon resonance cavity or both. Tunable optical interference filters are desirable because they can be effectively frequency matched to selected optical channels of a given frequency standard, such as the ITU frequency standard.

Beam splitters of the present invention include beam splitters capable of separating an incident beam into two beam components and directing the beam components into parallel phase control elements. In an exemplary embodiment, the beam splitter of the present invention comprises a partially reflective, planar optical coating in optical communication with the first phase control element and a planar reflective surface in optical communication with the second phase control element. In a preferred embodiment, the beam splitter of the present invention has a parallel reflector geometry, wherein the partially reflective optical coating and reflective surface are located in substantially parallel planes with respect to each other. The partially reflective optical coating is capable of reflecting a first component of the incident optical beam into the phase control element and passing a second component of the incident optical beam to the reflective surface. Optionally, the beam splitter may further comprise an additional reflective surface located in a plane substantially parallel to the other reflective surface and positioned such that partially reflective optical coating is located between the two reflective surfaces. In this embodiment, the additional reflector steers the incident beam onto the optical coating for separation into first and second beam components.

In an exemplary embodiment, the parallel reflector geometry of the beam splitter is provided by a first prism element having a reflective surface, first beam coupling surface, first prism coupling surface and first phase control element interface and a second prism element having a reflective surface, second beam coupling surface, second prism coupling surface and second phase control element interface. First and second beam coupling surfaces may be wedged (not parallel) with respect to the first and second phase control element interfaces to minimize back reflections and spurious etalons. Further, first beam coupling surface may comprise an antireflective surface coating to achieve high light throughput into and out of the optical interference filter. First prism element and second prism are operationally coupled to provide efficient propagation of light through the beam splitter and the partially reflective optical coating is located at the optical interface between first and second prism elements. In a preferred optical arrangement, first prism element and second prism element are coupled in a manner providing a parallelogram beam splitter geometry. In this embodiment, the first phase control element interface and the second phase control element interface occupy substantially the same plane and first beam coupling surface and the second beam coupling surface occupy substantially the same plane. Thus, an overall parallelogram geometry is formed by parallel reflective surfaces of the first and second prism elements and parallel planes containing first and second beam coupling surfaces and the first and second phase control element interfaces. The parallelogram optical arrangement of the present invention provides a beam splitter in which the incident beam, first beam component and second beam component are parallel for all rotational orientations with respect to the incident beam and the reflective surface. The use of parallel incident and component beams are beneficial because it allows spatially precise incorporation of phase control elements having selected optical path lengths from beam splitter to external reflector. Further, the parallel reflector optical arrangement provides optical interference filters that are more easily frequency tuned by angle tuning methods well known in the art. Angle tuning refers to rotating the optical arrangement of the present invention with respect to the axis of propagation of the incident beam to achieve selective adjustment of the optical path length through the interference filter.

The parallel reflector geometry of the present invention has significant benefits related to the fabrication of interleavers of the present invention. First, parallel reflecting surfaces and optical coatings can be manufactured to high angular precision using well-developed planar-parallel fabrication technology, particularly double-sided lapping methodologies. The angular precision achieved by double-sided lapping improves the extent of both horizontal and vertical recombination of first and second beam components.

Second, the planar, parallelogram beam splitter itself comprises an interferometer having unequal optical path length legs, which is easily evaluated using conventional optical interterometry techniques. Specifically, the optical path length difference of first and second beam components can be easily measured by directing a tunable laser onto the first beam coupling surface and monitoring reflected light exiting the second beam coupling surface. This technique allows measurement of the optical path length difference to approximately 0.01 $\mu$m. If a substantial deviation in the pre-selected optical path length difference is observed, the parallel reflective surfaces can be re-polished to achieve a difference in first and second beam component optical path lengths within the desired tolerances. Accordingly, the present interleaver design allows for fabrication methods providing iterative polishing and optical path length evaluation steps, in contrast to orthogonal interferometer designs of the prior art. The ability to precisely evaluate the difference in optical path length of first and second beam components iteratively, during fabrication results in less costly and more accurate methods of manufacturing optical interleavers.

Third, the planar, parallelogram beam splitter configuration of the present invention is easily coupled to parallel phase control elements, such as air gap phase control elements, dielectric phase control elements, etalons, GT etalons and multi-cavity interference filters. Coupling phase control elements to the parallelogram beam splitter configuration is greatly facilitated by having both phase control element interfaces occupy the same or plane or parallel planes. Preferred coupling methods include but are not limited to optical contact bonding and use of optical cements.

Finally, the parallel reflector geometry of the present invention provides methods of manufacturing optical interference filters that comprise substantially less fabrication steps than conventional methods of manufacturing optical interleavers having an orthogonal interferometer geometry. Double-side lapping techniques allow the fabrication of two parallel surfaces simultaneously, in contrast to methods of fabricating cube-type orthogonal beam splitters that require each surface to be individually worked. In addition, double-sided lapping techniques provide an improvement of approximately one order of magnitude in angular matching achievable over fabrication methods for conventional cube-type beam splitters having an orthogonal optical geometry.

In a preferred embodiment, the beam splitter comprises a 50/50-beam splitter capable of separating the beam into first and second beam components with substantially equivalent intensities. A 50/50-beam splitter is preferred because it is capable of generating two substantially equivalent beam components, which may be coherently combined to provide substantially complete optical interference. The beam splitter of the present invention may be polarization insensitive or polarization selective.

Reflective surfaces of the first and second prism elements are preferably configured to provide total internal reflection of the incident light beam and second beam component, respectively. Alternatively, the reflective surfaces of first and second prism elements may comprise thin film layers capable of providing high reflectivity. In a preferred exemplary embodiment, the reflective surface of the second prism element has a phase correcting surface coating, which minimizes the change in phase between s and p polarization states upon total internal reflection. Phase correcting surface coatings useable in the present invention include but are not limited to one or more thin films coatings comprising $SiO_2$, $Ta_2O_5$, $HfO_2$, $MgF_2$, $TiO_2$ and $Al_2O_3$. An exemplary phase corrective coating comprises a $Ta_2O_5$ layer having a thickness approximately equal to a half wave at 1550 nm. An alternate phase corrective coating comprises a 4 layer thin film sequence comprising alternating $Ta_2O_5$ and $SiO_2$ layers having a thickness equal to a half wave at 1550 nm. Importantly, because the reflective surface is configured to provide total internal reflection, addition of phase connective surface coatings comprising thin films does not substantially affect the net reflectivity of the reflective surface. Use of a phase correcting surface coating is important to preserve the function of the polarization diversity scheme and to improve the, extraction of counter propagating channels. Minimizing the change in phase between s and p polarization states improves the extent of optical interference observed upon recombination of first and second beam components and reduces polarization-dependent losses. Accordingly, interleavers of the present invention having phase correcting surfaces are capable of providing substantially square-wave shaped transmission bands with greater transmission of light corresponding to selected transmission channels.

In another preferred embodiment, the optical interference filter of the present invention further comprises one or more path length compensation elements positioned between the beam splitter and the first phase control element, second phase control element or both. Preferred path length compensation elements have an internal end and an external end and are positioned such that their internal ends are substantially parallel to the internal end of the first phase control element, second phase control element or both. In an exemplary preferred embodiment, the internal end of the path length compensation element is substantially parallel to the internal ends of the first phase control element, second phase control element or both. Path length compensation elements function to provide an additional optical path for first beam component, second beam component or both. In a preferred embodiment, inclusion of a path length compensation element provides additional optical path length to the first beam component, reflected by the partially reflective coating, equal to the difference between the optical path lengths of first and second beam component through the beam splitter.

Inclusion of a path length compensation element in the optical interference filter of the present invention provides selectable control over the optical path lengths of the first beam component, second beam component or both by providing additional media for the light waves to propagate through. Path length compensation elements may provide optical interference filters having identical optical path lengths of first and second beam components from beam splitter to external reflectors. Alternatively, in a preferred embodiment comprising an optical interleaver, path length compensation elements may provide optical interference filters wherein the optical path length of the first beam component from beam splitter to external reflector is different from the optical path length of the second beam component from beam splitter to external reflector. The ability to selectably, adjust the optical path length of first beam component, second beam component or both provides control over the sum of phases realized upon combination of first and second beam components, which establishes the nature and extent of optical interference achieved. Path length compensation elements of the present invention may be of any optical path length. Preferred optical path lengths of path length compensation elements are selected from the range of about 100 nm to about 200 mm.

In addition, path length compensation elements may be selected to provide optical interference filters wherein the optical path length of first and second beam components through a particular material, such as fused silica, are equal. Optical interference filters having path length compensation elements that provide equal optical path lengths through a particular material, such as fused silica, are especially desirable because they provide filters that are thermally stable. Specifically, such a configuration provides an interferometer structure in which fused silica regions undergo equivalent thermal expansion or contraction associated with a given change in temperature. Accordingly, the selected difference in the optical path lengths of first and second beam components does not change significantly with temperature, providing for optical interference filters having constant transmission characteristic over the temperature range of about −40° C. to about 85° C. In addition, matching the optical path lengths of first and second beam components through a particular material, such as fused silica, minimizes temporal distortion of optical signals resulting from chromatic dispersion.

In a preferred embodiment, an optical interleaver of the present invention is an optical interference filter having a first GT etalon phase control element and a second air gap phase control element oriented in parallel interferometer geometry. In this embodiment, the optical thickness of the resonance cavity, L, is selected to provide selected free spectral range and resonance frequencies of the optical interference filter. To provide an interleaver having substantially square-wave shaped transmission bands, the optical path length of the air gap is selected to equal a value of approximately L/2 and at least one path length compensation element is employed to provide equivalent optical path lengths from the beam splitter to the partially reflective internal reflector of the GT etalon phase control element and from the beam splitter to the front plate of the air gap phase control element. A preferred optical interleaver of the present invention having substantially square wave shaped transmission bands and a free spectral range of about 100 GHz comprises a GT etalon with a resonance cavity having an optical path length equal to about 3 mm and an air gap having an optical path length equal to about 1.5 mm, arranged in a parallel phase control element geometry.

Optical interference filters of the present invention having a 200 GHz free spectral range comprise preferred filters for adding or dropping even or odd channels of the ITU frequency standard. Other free spectral range values, such as 6.25 GHz, 12.5 GHz, 50 GHz, 100 GHz, 200 GHz, 400 GHz and 800 GHz are useful for separating a plural signal into discrete signal streams other than those corresponding to even and odd channels. Optical filters having a first GT etalon phase control element and a second air gap phase control element are capable of providing a transmission spectrum comprising periodic, substantially square-wave transmission bands with selected band width, particularly well suited for multiplexing and demultiplexing applications. Square-wave transmission bands are useful for demultiplexing plural optical signal streams with minimum cross talk because the position of the transmission bands and bandwidth may be selectably adjusted such that the bands only overlap the frequency range corresponding to selected channels. Accordingly, such optical configurations efficiently transmit light corresponding to selected channels and effectively prevent transmission of light having frequencies outside the spectral range of selected transmission channels. The bandwidth of transmission bands of the optical interference filter of the present invention may be selectably adjusted by selection of (1) the reflectivity of the partially reflective internal reflector of the GT etalon phase control element, (2) the optical path length of the air gap cavity, (3) the optical path length of the etalon resonance cavity and (4) any combinations of these. Selection of a highly reflective internal reflector results in narrower transmission bands and selection of an internal reflector with lower reflectivity results in broader transmission bands. In a preferred embodiment, the partially reflective internal reflector has a reflectivity of about 14%, which provides an optimal bandwidth for multiplexing and demultiplexing optical channels of the ITU frequency standard.

In another preferred embodiment, an optical interleaver of the of the present invention is an optical interference filter having a first GT etalon phase control element and a second GT etalon phase control element oriented in parallel interferometer geometry. In one embodiment, first and second GT etalon phase control elements have the same resonance cavity optical path lengths for a given angel of incidence. In an alternative embodiment, first and second GT etalon phase control elements have resonance cavities with different optical path lengths for a given angle of incidence. Use of a first GT etalon phase control element with a resonance cavity optical path length approximately the same value as the resonance cavity of the second GT etalon phase control element provides an optical interleaver with highly squarewave shaped transmission bands and improved chromatic dispersion characteristics. Improved chromatic dispersion characteristics refer to interference filters that exhibit reduced broadening of optical signals with respect to time due to optical dispersion. Optionally, dual GT etalon optical interference filters providing interleaver functionality also comprise one or more air gaps in optical communication with the first GT etalon phase control element, second GT etalon phase control element or both.

Optical interference filters of the present invention may be used for frequency discrimination applications, such as wavelength division multiplexing and demultiplexing applications. In such applications, an optical interleaver of the present invention may be used in combination with conventional thin film filters to isolate a single optical stream from a multiplexed plural optical stream prior. To achieve frequency discrimination, a multiplexed signal comprising a plurality of closely spaced optical channels is first passed through an optical interleaver configured only to transmit selected transmission channels. The plural multiplexed optical signal transmitted by the optical interleaver comprises a plurality of substantially more broadly spaced channels (less dense), which may be efficiently separated by conventional dielectric optical filters, such as an etalon, cut off filter, multi-cavity thin film filter or any combinations of these optical components. Alternatively, series of optical interleavers of the present invention may be employed to achieve a greater degree of signal separation prior to isolation by convention dielectric optical filters and detection. For example, a greater degree of signal separation of optical channels corresponding to the ITU frequency grid can be achieved by optically coupling a first optical interleaver having a free spectral range of 100 GHz to a second optical interleaver having a free spectral range of 200 GHz. In this optical configuration, the first optical interleaver converts an incident plural optical stream into a second more broadly spaced (less dense) plural optical stream comprising only even or odd channel, which is transmitted to the second interleaver. The second interleaver only transmits even and odd channels of the second plural optical stream, thereby, creating an even more broadly spaced third optical stream, which may be efficiently isolated using conventional thin film dielectric optical filters.

The present invention includes methods of fabricating optical interference filters with substantially parallel phase control elements. A preferred method of fabricating optical interleavers having parallel interferometer geometry comprises the steps: a) simultaneously polishing two sides of a first prism element thereby forming a first prism coupling surface and a first reflective surface located in substantially parallel planes with respect to each other; b) simultaneously polishing two sides of a second prism element thereby forming a second prism coupling surface and a second reflective surface located in substantially parallel planes with respect to each other; c) depositing a thin film optical coating on the first prism coupling surface of the first prism element; d) coupling the first and second prism elements, wherein the coated first prism coupling surface of the first prism element is operationally coupled to the second prism coupling surface of the second prism element thereby creating a beam splitter having polished first and second reflective surfaces located in substantially parallel planes, first and second unpolished, phase control element interface surfaces located in substantially parallel planes and an un polished beam coupling surface; e) polishing the first and second phase control element interface surfaces of the beam splitter; f) polishing the beam coupling surface of the beam splitter; g) simultaneously polishing a two sides of a path length compensation element thereby forming an internal end and an external end located in substantially parallel planes with respect to each other; h) operationally coupling the internal end of the path length compensation element to the first phase control element interface of the beam splitter; i) polishing the internal end of a first phase control element and operationally coupling the polished internal end of the first phase control element to the external end of the path length compensation element; and j) polishing the internal end of a second phase control element and coupling the polished internal end of the second phase control element to the polished second phase control element interface surface of the beam splitter.

The invention is further illustrated by the following description, examples, drawings and claims.

BRIEF DESCRIPTION OF THE DRAWINGS

As illustrated in FIG. 7, inclusion of a phase correcting surface results in a transmission spectrum having substantially square-wave shaped transmission bands.

As shown in FIG. 8, the optical interference filter transmits light corresponding to even transmission channels and prevents transmission of light corresponding to odd transmission channels.

As shown in FIG. 9, the optical interference filter transmits light corresponding to odd transmission channels and prevents transmission of light corresponding to even transmission channels.

DETAILED DESCRIPTION OF THE INVENTION

Figure 1:
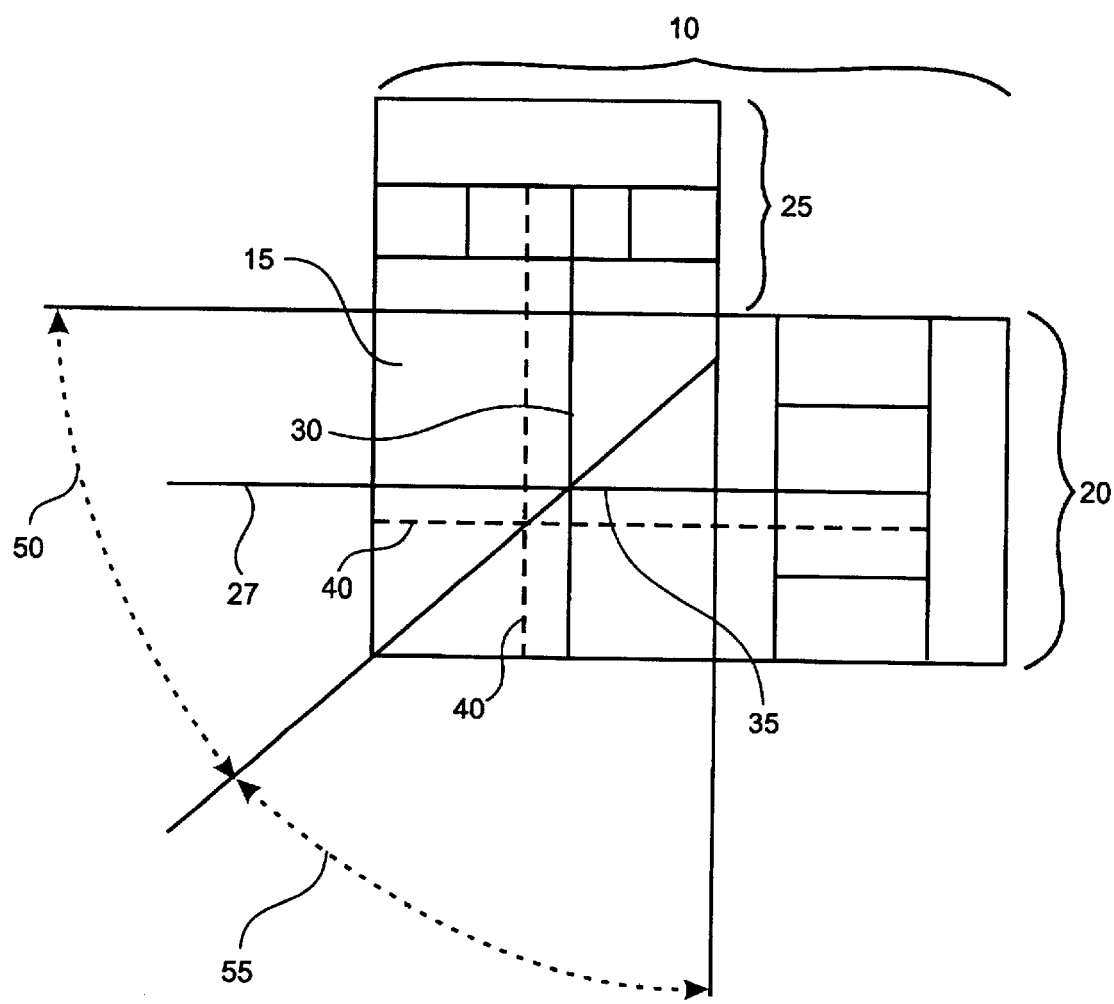
FIG. 1 is a schematic drawing showing a top plan view of an optical interference filter of the prior art having a etalon phase control element and an air gap phase control element arranged in an orthogonal interferometer geometry.

Referring to the drawings, like numerals indicate like elements and the same number appearing in more than one drawing refers to the same element. In addition, hereinafter, the following definitions apply:

"Optical interference filter" refers to an optical device or device component that transmits light having selected frequencies and substantially prevents transmission of light having frequencies outside the range of selected frequencies. Optical interference filters may be characterized by their transmission spectra, which show the selected frequencies that are transmitted by the filter. Optical interference filters operate by separating an incident beam into a plurality of beam components that are subsequently coherently combined in a manner providing optical interference. Optical interference filters include but are not limited to Fabry Perot etalons, GT etalons, interleavers, interferometers, and multi-cavity thin film filters. The present is invention comprises fixed frequency optical interference filters having transmission spectra characterized by transmission bands having substantially constant frequencies. In addition, the present invention comprises tunable optical interference filters having transmission spectra characterized by transmission bands having selectably adjustable frequencies.

"Interleaver" refers to devices and device components capable of separating an optical signal comprising a plurality of signal components into separate channels corresponding to one or more selected signal components. Optical interleavers of the present invention are capable of separating an optical signal comprising a plurality of signal components corresponding to different frequencies of light into separate channels each associated with one or more optical signals corresponding to transmission channels. Interleaver also refers to devices and device components that are capable of mixing one or more discrete optical signals thereby creating a plural optical signal comprising the sum of discrete optical signals that are mixed.

"Phase control element" refers to any method, device or device component capable of varying the phase of an incident beam, beam component or sub-beam. Phase manipulation may be achieved by introducing an additional optical path length, dividing a beam into subcomponents, causing optical interference or other methods well known in the art. Phase control elements of the present invention include but are not limited to air gaps, dielectric layers, etalons, GT etalons, FP etalons, GT-etalon—air gap phase control elements, multi-cavity optical interference filters, a reflector positioned at the end of a selected optical path length and any combinations of these optical components.

"Beam splitter" refers to any device or device component capable of separating an incident beam into two or more beam components. Beam splitters of the present invention may separate an incident beam into substantially equivalent beam components or substantially dissimilar beam components. For example, beam splitters of the present invention include 50/50 beam splitters which divide a incident beam into two beam components that have substantially equivalent intensities, preferably having intensities within 5% of each other. Beam splitters of the present invention may be polarization insensitive or polarization selective. An exemplary beam splitter of the present invention has a parallel reflector geometry.

"Thin film layer" refers to a thin film comprising a coating of atoms, molecules or ions or mixtures thereof. Thin film layers useable in the present invention may comprise a single-layer or a plurality of thin films layers. Thin film layers useable in the present invention may have either a homogeneous composition or a heterogeneous composition and may comprise a single phase or a plurality of phases. Thin film layers of the present invention include but are not limited dielectrics, semiconductors, metals and any combinations of these materials. In a preferred embodiment, reference to thin dielectric layers in the present invention includes but is not limited to metal oxide, metalloid oxide and salt thin films. Metal oxides, metalloid oxides and salts useable in the present invention include but are not limited to $Ta_2O_5$, $SiO_2$, $HfO_2$, $TiO_2$, $MgF_2$, $CaF_2$, $Nb_2O_5$, glass or mixtures of these materials. Thin metalloid and metal layers of the present invention include but are not limited to Si and Al. Thin film layers of the present invention may be any size, shape, thickness or optical thickness. Thin film layers of the present invention include but are not limited antireflection coatings, partially reflective optical coatings, polarization selective optical coatings, partially reflective etalon reflectors, highly reflective etalon reflectors, and phase correcting coatings.

"Reflectors" refer generally to devices, device components and materials exhibiting reflectivity. Reflectors of the present invention include reflectors exhibiting partially reflectivity and reflectors that reflect substantially all incident light. The reflectance of reflectors useable in the present invention range from about 0.5% to about 100%. Preferred reflectors of the present invention comprise single-layer or multilayer coatings with alternating high and low indices of refraction layers. In a more preferred embodiment, reflectors of the present invention comprise thin film sequences of alternating high and low indices of refraction deposited on a substrate, preferably a fused silica substrate. The terms "high" and "low" indices of refraction are defined relative to one another. Accordingly, a "high" index of refraction is one larger than a "low" index of refraction and a "low" index of refraction is one smaller than a "high" index of refraction.

"Bandwidth" refers to the property of optical filters related to the distribution of wavelengths of light transmitted by a given transmission band. Bandwidth may be defined in terms of "dB bandwidth." dB bandwidth refers to the full width at the dB value indicated: In a preferred embodiment, the bandwidth of the optical interference filters of the present invention is selectably adjustable by variation of the optical path length of the resonance cavity of an etalon phase control element, the optical path of an air gap of an air gap phase control element, the extent of reflectivity of the etalon reflectors or any combination of these. In a more preferred embodiment, optical interference filters have a bandwidth selected from the range of about 100 MHz to about 200 GHz.

"Frequency standard" refers to one or more selected frequencies that are used in an optical system. For example, a frequency standard may comprise the transmission channels of a telecommunication system, such as the ITU frequency grid. Transmission channels may comprise a single frequency or a range of frequencies.

"Transmission band" refers to a distribution of wavelengths transmitted by an optical interference filter. Interference filters of the present invention are characterized by one or more transmission bands having a selectably, adjustable free spectral range, resonance frequency and bandwidth. Transmission bands of the present invention include but are not limited to sinusoidal transmission bands, substantially square-wave transmission bands, substantially Airy function shaped and substantially Gaussian shaped transmission bands. In a preferred embodiment, interleavers of the present invention are capable of providing periodic substantially square-wave transmission bands over the wavelength range of about 1520 nm to about 1630 nm. In another embodiment, interleavers of present invention have substantially square-wave transmission bands over the wavelength range of 1480 nm–1630 nm.

"Substantially square-wave shaped transmission band refers to transmission bands in which the intensity of transmitted light falls off very quickly as a function of frequency. Square-wave transmission bands of the present invention may have regions of maximum transmission that are flat or have some curvature and regions of minimum transmission that are flat or have some curvature.

"Free spectral range" is an optical property that characterizes the spacing of transmission bands of an optical interference filter. Specifically, free spectral range is a quantitative measure of the frequency spacing between successive transmission or phase maxima. Optical interference filters of the present invention have a free spectral range that is selectably adjustable. However, free spectral ranges given by the equations:

$$FSR = \frac{100 \text{ GHz}}{n} \quad \text{(I)}$$

$$FSR = n \times 100 \text{ GHz}, \quad \text{(II)}$$

where n is an integer, are preferred for multiplexing and demultiplexing optical signals corresponding to ITU channels.

"Double sided lapping" refers to a preferred method of fabricating parallel optical surfaces in which two optical surfaces are simultaneously polished. A preferred method of double sided lapping involves a process employing substantially equivalent polishing conditions, such as the pressures applied to each optical surface, to both sides polished. Double sided lapping methods are capable of making substantially parallel, highly parallel and very highly parallel optical surfaces.

"Frequency matching" refers to a method of aligning one or more transmission bands of an interference filter to overlap one or more frequencies of a frequency standard. Interference filters of the present invention may be frequency matched to selected optical channels of a selected frequency standard, such as the ITU frequency standard. In a preferred embodiment, the transmission bands of the optical interference filters of the present invention are frequency matched in a manner to substantially eliminate cross talk between closely spaced optical channels.

"Resonance cavity" refers to the space located between parallel reflectors of an etalon filter. In a preferred embodiment, a resonance cavity of the present invention comprises a dielectric cavity layer positioned directly adjacent to the internal side of each reflector comprising an etalon. In a more preferred embodiment, the resonance cavity comprises a Metal oxide, metalloid oxide or salt including but not limited to fused silica, $Ta_2O_5$, $SiO_2$, $HfO_2$, $TiO_2$, $MgF_2$, $CaF_2$, $Nb_2O_5$, and glass. Alternatively, the resonance cavity of the present invention may be an air gap cavity. In this embodiment, a air gap may be substantially evacuated or be filled with a selected pressure of one or more noncorrosive gas. Further, the air gap cavity may have a fixed, selected refractive index or a refractive index that is tunable. Resonance cavities of the present invention may have a fixed, selected optical path length for a given angle of incidence. Alternatively, resonance cavities of the present invention may have tunable optical path length. Preferred optical path lengths are selected from the range of about 100 nm to about 10 mm. More preferred optical path lengths are selected from the range of about 0.5 mm to about 5 mm.

"Ultra flat" refers to an extent of surface irregularity of a given optical surface with a deviation from average surface position approximately on the order of the light impinging on the surface. The spatial frequency of an ultra flat optical surface is smaller than the frequency of light impinging on the surface. In a preferred embodiment, ultra flat surfaces of the present invention have deviations from average surface position of less than 50 nm.

"Ultra smooth" refers to an extent of surface irregularity of a given optical surface wherein the lateral distance between prominent surface features is substantially smaller than the wavelength of light impinging on the surface. The spatial frequency of an ultra smooth optical surface is greater than the frequency of light impinging on the surface. In a preferred embodiment, ultra smooth surfaces of the present invention have deviations from average surface position of less than 1 Angstrom.

"Parallel" refers to a geometry in which two surfaces are equidistant from each other at all points and have the same direction or curvature. Substantially parallel refers to a geometry in which the angular deviation from absolute parallelism is less than 60 arcseconds. Highly parallel refers to a geometry in which the angular deviation from absolute parallelism is less than 30 arcseconds. Very highly parallel refers to a geometry in which the angular deviation from absolute parallelism is less than 2 arcseconds. In a preferred embodiment, the optical interference filters of the present invention comprise beam splitters having substantially parallel, highly parallel or very highly parallel reflective surfaces, optical coatings or both. In another preferred embodiment, the optical interference filters of the present invention comprise at least two phase control elements having substantially parallel, highly parallel or very highly parallel internal ends.

"Optical thickness" and "optical path length" refer to the effective path length of light that takes into consideration the refractive index of the material light is propagating through. Analytically, optical thickness and optical path length terms may be expressed in the following summation as the product of physical thickness and the refractive index of a layer or plurality of layers:

$$\text{optical thickness} = \text{optical path length} = \sum_{x} n_x \times L_x, \quad (III)$$

where $L_x$ is the physical thickness of region x and n is the refractive index of region x. "Optical contact" refers to a method of bonding two optical elements. A preferred method of optical contact coupling comprises the steps of: (1) cleaning and polishing the interface surfaces of the optical elements to be bonded, (2) laying the surfaces together at an optical interface and (3) applying a force to both surfaces such that the air is pressed out and optical contact is achieved. Optical contact coupling results from molecular or atomic attractions between molecules and elements of each bonded optical interface surface.

"Interleaver efficiency" refers to the transmission characteristic of interleavers of the present invention. High efficiency interleavers are capable of transmitting substantially all light having frequencies corresponding to selected transmission channels and preventing the transmission of substantially all light not having frequencies corresponding to selected transmission channels. Efficient interleavers are capable of demultiplexing plural optical signals with minimized cross talk. "dB" refers to a unit of measure given by the equation:

$$dB = 10 \times \text{LOG}\left(\frac{I_{out}}{I_{in}}\right) \quad (IV)$$

where $I_{out}$ is the intensity of light propagating through an optical device and $I_{in}$ is the intensity of light incident on an optical device.

"Front plate" refers to a material that defines one end of an air gap or resonance cavity. Front plates of the present invention are substantially transparent and have a selected optical thickness.

In the following description, numerous specific details of the devices, device components and methods of the present invention are set forth in order to provide a thorough explanation of the precise nature of the invention. It will be apparent, however, to those of skill in the art that the invention can be practiced without these specific details. Reference in the specification to "a preferred embodiment," "a more preferred embodiment" or "an exemplary embodiment" means that a particular feature, structure, or characteristic set forth or described in connection with the embodiment is included in at least one embodiment of the invention. Reference to "preferred embodiment," "a more preferred embodiment" or "an exemplary embodiment" in various places in the specification do not necessarily refer to the same embodiment.

This invention provides optical interference filters and interferometers and methods of making and using optical interference filters and interferometers. In particular, the present invention provides optical interference filters having parallel phase control elements, which are particularly useful for wavelength division multiplexing and demultiplexing applications.

Figure 2:
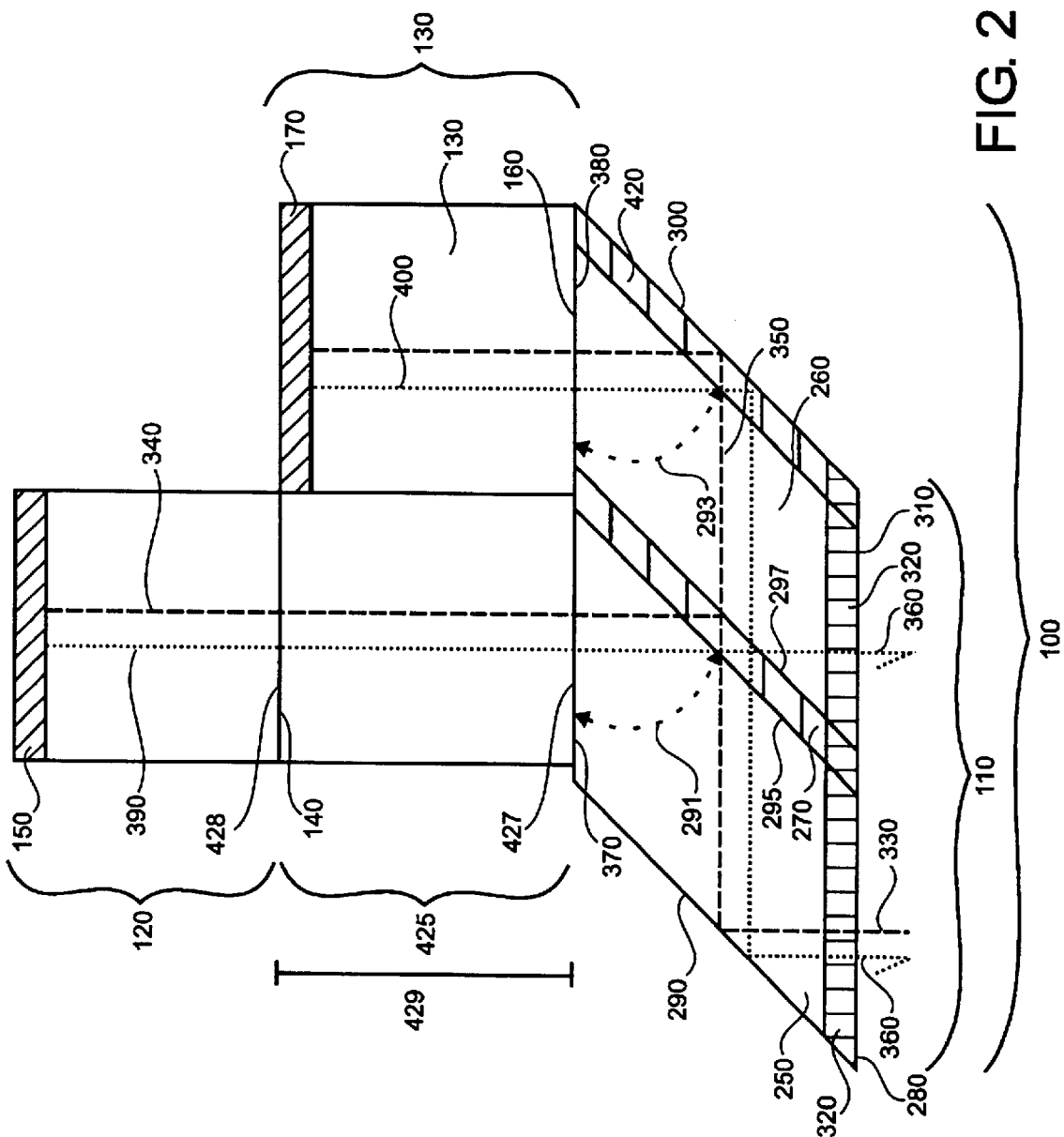
FIG. 2 is a schematic drawing showing a top plan view of an optical interference filter of the present invention having a first phase control element and a second phase control element arranged in parallel interferometer geometry. Also shown are the optical paths of the incident beam, first beam component, second beam component and output beams.

FIG. 2 illustrates an exemplary embodiment of the optical interference filter of the present invention having a parallel interferometer geometry. The illustrated interference filter (100) comprises first phase control element (120) and second phase control element (130), each positioned in optical communication with beam splitter (110). First phase control element has an internal end (140) positioned a selected optical path length from beam splitter (110) and comprises first external reflector (150). Second phase control element has an internal end (160) positioned a selected optical path length from beam splitter (110) and comprises second external reflector (170). External reflector (150) is positioned a first selected optical path length from beam splitter (110) and reflector (170) is positioned a second selected optical path length from beam splitter (110). In the preferred embodiment shown in FIG. 2, internal end (140) of first phase control element (120) and internal end (160) of second phase control element (130) are located in substantially parallel planes with respect to each other.

Beam splitter (110) comprises first prism element (250), second prism element (260) and partially reflective optical coating (270). First prism element (250) has a first beam coupling surface (280), a reflective surface (290), first prism coupling surface (295) and a first phase control element interface (370). Second prism element (260) has a reflective surface (300), second beam coupling surface (310), second prism coupling surface (297) and a second phase control element interface (380). In the preferred embodiment depicted in FIG. 2, reflective surface (290), reflective surface (300) and partially reflective optical coating (270) are located in substantially parallel planes with respect to each other and are in optical communication. In a preferred embodiment providing high angular recombination, reflective surface (290) and reflective surface (300) are substantially parallel such that angle (291) and angle (293) are approximately equal, preferably within 60 arcseconds.

The optical paths of incident beam (330), first beam component (340), second beam component (350) and output beams (360) are also shown in FIG. 2. Incident light beam (330) is directed at first beam coupling surface (280) and is reflected at reflective surface (290). In a preferred embodiment, incident beam (330) comprises linearly polarized light. Reflected incident beam (330) interacts with partially reflective optical coating (270) where it is divided into first beam component (340) and a second beam component (350). First beam component (340) is directed through first phase control element interface (370) to first phase control element (120), wherein it undergoes phase modification and is substantially reflected by external reflector (150). Second beam component (350) passes through partially reflective optical coating (270) and is reflected by reflective surface (300). Second beam component (350) is directed through second phase control element interface (380) to second phase control element (130), wherein it undergoes phase modification and is substantially reflected by external reflector (170). Reflected first beam component (390) and reflected second beam component (400) are coherently combined at partially reflective optical coating (270) and undergo optical interference. The nature and extent of optical interference depends on the phase modification of first and second beam components in first phase control element and second phase control, respectively. Output beams (360) exits beam splitter (110) through first beam coupling surface (280) and second beam coupling surface (310).

Optionally, beam splitter (110) may further comprise antireflection coatings (320) located on first beam coupling surface (280) and second beam coupling surface (310). Preferably, first beam coupling surface and second beam coupling surface exhibit less than 0.25% reflectance at normal angle of incidence when coated by antireflection coating (320). Inclusion of antireflection coating (320) is beneficial because it minimizes unwanted reflections and increases the throughput of light into and out of optical interference filter (100). In addition, first beam coupling surface (280) and second beam coupling surface (310) may be slightly wedged (not parallel) with respect to first phase control interface (370) and second phase control interface (380) to minimize back reflections and the occurrence of spurious etalons.

In a preferred embodiment, reflective surfaces (290) and (300) are configured to provide for total internal reflection of the incident beam, beam components and output beams. Alternatively reflective surfaces (290) and (300) may comprise thin film reflectors or thin metallic film reflectors, providing substantial reflectivity. Thin film reflectors of the present invention include but are not limited to sequences of thin film layers comprises alternating high refractive index layers and low refractive index layers. Preferably, reflective surfaces (290) and (300) have reflectivities selected from the range of about 70% to about 100%. In an example embodiment, reflective surface (290) and reflective surface (300) are substantially parallel and angle (291) and angle (293) are about equal. In a preferred embodiment, reflective surface (290) and reflective surface (300) are highly parallel. In a more preferred embodiment, reflective surface (290) and reflective surface (300) are very highly parallel. In a preferred embodiment, reflective surfaces (290) and (300) are ultra flat, ultra smooth and are about 8 mm in length.

Partially reflective optical coatings useable in the present invention include any combination of thin film layers that exhibit at least partial reflectivity. In a preferred embodiment, partially reflective optical coating (270) comprises a sequence of thin films with alternating high and low refractive indices. Thin film optical coatings may comprise any number of high and low refractive index pairs. In an exemplary embodiment, high refractive index layers and low refractive index layers are metal oxide layers that are directly deposited on first prism element (250) or second prism element (260). High and low index of refraction layers useable in the present invention include but are not limited to $Ta_2O_5$, $SiO_2$, $HfO_2$, $MgF_2$, $CaF_2$, $TiO_2$ and $Nb_2O_5$. Partially reflective optical coating (270) may be deposited on first prism coupling surface (295), second prism coupling surface (297) or both and is preferably deposited on ultra smooth and ultra flat prism coupling surfaces to achieve spatial uniform and substantially flat coatings. Deposition of optical coating (270) may be achieved by deposition techniques well known in the art including ion beam sputtering techniques, electron beam vaporization and deposition, chemical deposition and physical deposition. Ion beam sputtering deposition is preferred because it provides highly parallel and spatially uniform optical coatings. Preferably, high refractive index layers and low refractive index layers have an optical thickness equal to about ¼ the wavelength of light corresponding to center resonance frequency of the reflector and are made of $Ta_2O_5$ (refractive index of 2.025) and $SiO_2$ (refractive index of 1.445), respectively. Alternatively, partial reflective coating (270) may comprise non-quarter wave layers in a manner well known in the art of thin film reflectors.

In a preferred embodiment, partially reflective optical coating (270) is capable of separating the incident beam into first and second beam components with substantially equivalent intensities. An exemplary partially reflective optical coating (270) of the present invention has a reflectivity of 50%±2%. The present invention, however, includes embodiments wherein partially reflective optical coating (270) separates the incident beam into beam components having different intensities. Preferred partially reflective optical coatings exhibit substantially constant reflectivity over the range of wavelengths from about 1520 nm about 1620 nm. In an exemplary embodiment, partially reflective optical coating (270) of the present invention is polarization insensitive. In an alternative exemplary embodiment, partially reflective optical coating (270) is polarization selective, wherein first beam component (340) is substantially one polarization orientation and the polarization of second beam component (350) is different than the polarization orientation of the first beam component. For example, optical coating (270) may substantially reflect light corresponding to the s-polarization state and substantially transmit light corresponding to the p-polarization state.

First prism element (250) and second prism element (260) may comprise any dielectric material. First prism coupling surface (295) and second prism coupling surface (297) may be operationally coupled by optical bonding techniques well known in the art including but not limited to optical contact bonding and the use of optical cements. Optical contact bonding is preferred because it does not substantially affect the transmission of incident beam and beam components, does not introduce parallelism errors and does not substantially influence the composition or reflectivity of optical coating (270). Exemplary prism elements (250) and (260) comprise fused silica and have about 5 mm long beam coupling surfaces and about 8 mm long reflective surfaces. In a preferred embodiment, prism elements (250) and (260) comprise the same dielectric material to provide thermal stability, namely substantially constant transmission bands over a temperature range of about −40° C. to 85° C. In a preferred embodiment, first and second prism elements have ultra smooth and ultra flat beam coupling surfaces, reflective surfaces, phase control element interfaces and prism coupling surfaces. Ultra flat and ultra smooth surfaces comprise effective substrates for depositing optical coatings and provide surfaces that may be effectively coupled via optical contact bond methods well known in the art.

First and second phase control elements useable in the present invention include but are not limited to air gaps, dielectric layers, etalons, GT etalons, FP etalons, multicavity optical interference filters and reflectors positioned at the end of a selected optical path length or any combination of these.

Optionally, optical interference filter (100) may further comprise path length compensation element (425) having internal end (427), external end (428) and a selected optical path length (429). In a preferred embodiment, internal end (427) of path length compensation element and internal end (160) of second phase control element are located in substantially parallel planes, highly parallel planes or very highly parallel planes. In the exemplary embodiment shown in FIG. 2, path length compensation element (425) is in optical communication with partially reflective optical coating (270) and internal end (427) of path length compensation element and internal end (160) of second phase control element are located in substantially the same plane. Path length compensation element (425) may be operationally connected to first phase control element (120). Alternatively, path length compensation element (425) may comprise an integral component of first control element (120). Optical interference filters of the present invention include optical arrangements wherein path length compensation element (425) is operationally connected to second phase control element (130) or embodiments having a plurality of path length compensation elements operationally connected to both first and second phase control elements. In a preferred embodiment, path length compensation element (425) has an ultra smooth and ultra flat internal end (427) and external end (428).

Path length compensation elements of the present invention may be comprised of any dielectric material. In an exemplary embodiment, path length compensation element (425) is fused silica. The optical path length of path length compensation element (425) is chosen to select a desired optical path length difference between first and second beam components. Optical path length (429) may be selected to provide substantially equivalent optical path lengths of first beam component from partially reflective optical coating (270) to internal end (140) and of second beam component and of second beam component from partially reflective optical coating (270) to internal end (160). Alternatively, optical path length (429) may be selected to provide substantially equivalent optical path lengths of first beam component (340) and second beam component (350) through a particular material, such as fused silica. In this embodiment, thermal stability arises from identical optical path length changes of first and second beam components through first and second prism elements, respectively, due to equivalent thermal expansion or contraction experienced by first and second prism elements.

Beam splitters, phase control elements and path length compensation elements of the present invention may be operationally coupled by techniques well known in the art of fabricating optical devices including but not limited to optical contact bonding and use of optical cements. Optical contact bonding is preferred because it has no significant affect on transmission and optical path length of incident beam, first beam component and second beam component. Beam splitters, phase control elements and path length compensation elements of the present invention preferably have ultra flat and ultra smooth surfaces to assure uniform and strong optical coupling.

In a preferred embodiment, beam splitter (110) further comprises phase correction surface coating (420) located on reflective surface (300). The need for phase correction surface coating (420) arises from the fact that second beam component (350) undergoes two total internal reflections on reflective surface (300) that first beam component (340) does not undergo. The additional total internal reflections convert the overall polarization diversity scheme of second beam component (350) from linear polarized light to elliptically polarized light. If uncorrected, the loss of linear polarization results in incomplete interference upon recombination of first and second beam component. In an exemplary embodiment of the present invention, reflective surface (300) is coated with phase correction coating (420) which provides a 180±2 degree phase shift difference between s and p polarization states upon each total internal reflection. Specifically, the polarization states of s and p components of second beam component are retarded upon first total internal reflection by reflective surface (300) such that the difference is 180 degrees. After interaction with external reflector (170), the polarization states of s and p components of the reflected second beam component (400) are again retarded by 180 degrees with respect to each other upon second total internal reflection by reflective surface (300), thereby, preserving the function of the overall polarization diversity scheme. Phase correcting surface coatings of the present invention may comprise one or more thin film layers deposited on reflective surface (300). Thin layer phase correcting surface coatings of the present invention include but are not limited to $SiO_2$, $Ta_2O_5$, $HfO_2$, $MgF_2$, $TiO_2$ and $Al_2O_3$. Alternative phase correction surface coatings include birefringent elements such as ¼ wave retardation plates.

Phase correction surface coating (420) minimizes the net change in phase between the s and p polarizations during total internal reflections of the second beam component at reflective surface (300). Minimizing the change in phase between s and p polarizations improves the extraction of counter propagating channels. Further, minimizing the change in phase between s- and p-polarization states improves the extent of optical interference observed upon recombination of first and second beam components and reduces polarization-dependent losses.

Figure 3:
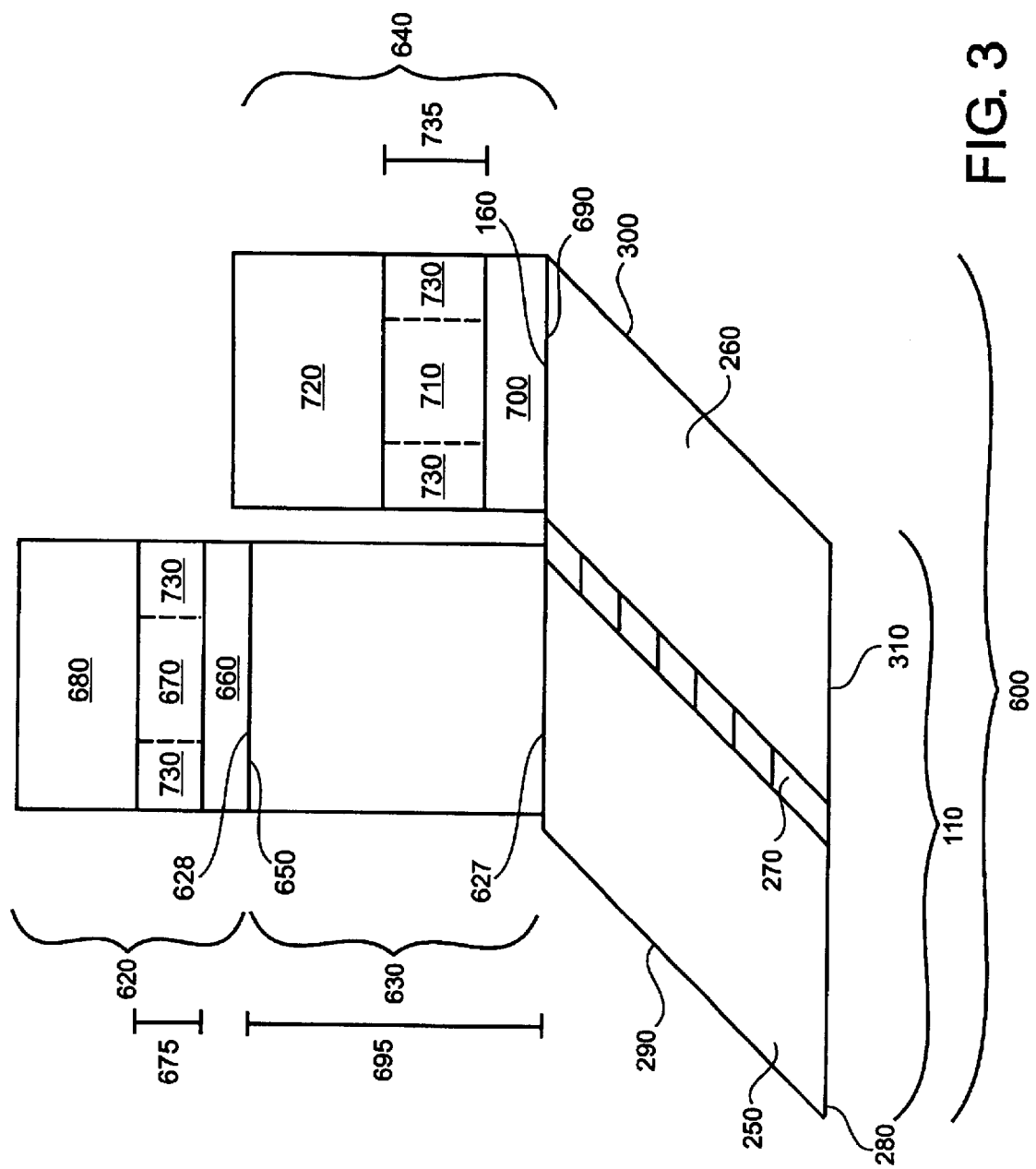
FIG. 3 is a schematic drawing showing a top plan view of an optical interference filter of the present invention having a first air gap phase control element and a second GT etalon phase control element arrange in parallel interferometer geometry.

FIG. 3 illustrates an exemplary embodiment of the optical interference filter of the present invention having an etalon phase control element and an air gap phase control element arranged in parallel interferometer geometry. The illustrated optical interference filter (600) comprises beam splitter (110), path length compensation element (630), air gap phase control element (620) and etalon phase control element (640). Air gap phase control element has an internal end (650) and comprises front plate (660) and first external reflector (680), each positioned in optical communication with beam splitter (110). Front plate (660) and external reflector (680) are separated by air gap (670) having a selected optical path length (675). Front plate (660) of air gap phase control element preferably has an ultra smooth and ultra flat internal end (650). Front plate (660) may further comprise an antireflection coating, not shown in FIG. 3, to prevent unwanted reflections and increase transmission into air gap phase control element (620). Etalon phase control element has an internal end (690) and comprises partially reflective internal reflector (700) and second external reflector (720), each positioned in optical communication with beam splitter (110). In a preferred embodiment, internal reflector (700) and front plate (660) have substantially equivalent optical thicknesses. Internal reflector (700) and external reflector (720) are located in substantially parallel planes and, thereby, form resonance cavity (710) having a selected optical path length (735). Path length compensation element (630) has an internal end (627), an external end (628) and a selected optical path length (695).

In a preferred embodiment, internal end (650) of air gap phase control element and internal end (690) of etalon phase control element are located in substantially parallel planes with respect to each other. In a more preferred embodiment, internal end (627) of path length compensation element (630), internal end (650) of air gap phase control element and internal end (690) of etalon phase control element are located in substantially parallel planes, highly parallel planes or very highly parallel planes. In the exemplary embodiment shown in FIG. 3, internal end (627) of path length compensation element (630) and internal end (690) of etalon phase control element are located in substantially the same plane.

Path length compensation element (630) has selected optical path length (695) for a given angle of incidence and is operationally coupled to beam splitter (110) and air gap phase control element (620). Alternatively, path length compensation element may be integrated into air gap phase control element (620), wherein front plate (660) and path length compensation element comprise a single piece of fused silica or other dielectric material. Optical path length (695) may be any length. Preferably, optical path length (695) is selected to provide a selected optical path length difference between first and second beam components. In a preferred embodiment, optical path length (695) is selected to provide substantially equivalent optical path lengths of first beam component from partially reflective optical coating (270) to internal end (650) of air gap phase control element (620) and of second beam component from partially reflective optical coating (270) to internal end (690) of etalon phase control element (640). In another preferred embodiment, first prism element (250), second prism element (260) and path length compensation element (630) are fused silica and optical path length (695) is selected to provide substantially equivalent optical path lengths of first and second beam components through fused silica. Selection of optical path length (695) to provide equivalent optical path lengths through fused silica provides an optical interference filter (600) having high thermal stability and favorable chromatic dispersion characteristics. The present invention includes other embodiments wherein a path length compensation element of selected optical path length is operationally connected to etalon phase control element (640) to allow selection of the optical path length of second beam component.

Optionally, air gap phase control element (620), etalon phase control element (640) or both may further comprise alignment spacers (730). Alignment spacers (730) may be operationally coupled to front plate (660), first external reflector (680) or both to provide a substantially fixed optical path length through air gap (670) for a given angle of incidence. Similarly, alignment spacers (730) may be operationally coupled to partially reflective internal reflector (700) and external reflector (720) to provide a substantially fixed optical path length (735) through resonance cavity (710) for a given angle of incidence. Alternatively, alignment spacers (730) may provide a means of selectably adjusting optical path length (675), optical path length (735) or both. Alignment spacers capable of selectably adjusting optical path length include but are not limited to piezoelectric crystal elements and electro-optical modulators.

In the exemplary embodiment shown in FIG. 3, etalon phase control element is a GT etalon. In this embodiment, external reflector (720) is highly reflective, preferably having a reflectivity selected from the range of about 90% to about 100%, and may comprise any material exhibiting high reflectivity. Internal reflector (700) is partially reflective, preferably having a reflectivity selected from the range of about 0.5% to about 70% and may comprise any material exhibiting partial reflectivity. Control of the reflectivity of partially reflective internal reflector (700) selectably adjusts the bandwidth of optical filter (600). In a preferred exemplary embodiment, partially reflective internal reflector (700) has a reflectivity of 14%±1% providing a −30 dB bandwidth equal to approximately ¼ the 100 GHz ITU channel spacing, ≈25 GHz, which is especially useful for multiplexing and demultiplexing optical signal streams corresponding to the transmission channels of the ITU frequency standard.

In a preferred embodiment, external reflector (720) and internal reflector (700) are first and second sequences of thin film layers each comprising alternating high index of refraction dielectric layers and low index of refraction dielectric layers deposited on a substrate layer. In an exemplary preferred embodiment, high refractive index layers and low refractive index layers are metal oxide layers that are deposited on to a fused silica substrate. High and low refractive index layers include but are not limited to glass, fused silica, quartz, sapphire, germanium, zinc selenide, $Ta_2O_5$, $SiO_2$, $HfO_2$, $TiO_2$, $MgF_2$, $CaF_2$ and $Nb_2O_5$. In a preferred embodiment, dielectric layers and substrates of the present invention have ultra smooth and ultra flat surfaces.

Resonance cavity (710) comprises an air gap resonance cavity or a dielectric layer cavity having an optical path length (735) for a given angle of incidence selected to provide desired free spectral range and resonance frequencies of optical interference filter. Air gap phase control element has an air gap optical path length (675) for a given angle of incidence selected to provide desired free spectral range and resonance frequencies of optical interference filter. In exemplary embodiments having path length compensation element (630) configured to provide equivalent optical path lengths of first and second beam components through fused silica, substantially square wave transmission bands are be achieved by selecting an air gap optical path length (675) given by the expression:

$$L_{etalon} = 2 \times L_{airgap}, \quad (V)$$

where the refractive index of air gap (670) and resonance cavity (710) are substantially equivalent. In a preferred embodiment, optical interleavers of the present invention having an air gap phase control element and a GT etalon phase control element arranged in parallel interferometer are capable of providing periodic, substantially square-wave transmission bands over a wavelength range of about 1520 nm to about 1630 nm.

A preferred optical interference filter having a etalon phase control element and an air gap phase control element arranged in parallel geometry, as shown in FIG. 3, has a free spectral range of about 100 GHz and a −30 dB bandwidth of about 25 GHz. In this embodiment, the etalon phase control (640) is a GT etalon having a resonance cavity (710) with an optical path length of about 3 mm, providing a 50 GHz free spectral range of the GT etalon. Path length compensation element (630) is selected such that first beam component has an optical path length from optical coating (270) to internal end (628) of the air gap phase control element equal to the optical path length of the second beam component from optical coating (270) to internal end (690) of the etalon phase control element. Front plate (660) and internal reflector (700) are constructed so that each have the same optical thickness. Air gap phase control element has a air gap (670) having a optical path length of about 1.5 mm. The optical arrangement of this embodiment provides a 1.5 mm difference between the optical path length of first beam component from optical coating (270) to external reflector (680) and the optical path length from second beam from optical coating (270) to external reflector (720). This preferred embodiment provides an optical interference filter useful for multiplexing and demultiplexing optical signals corresponding to the ITU frequency standard. As will be clear to those having skill in the art, the present invention includes embodiments having front plate (660) and internal reflector (700) with different optical thicknesses. In these embodiments, path length compensation element (630) has an optical path length (695) selected to compensate for difference in optical thickness of front plate and internal reflector and to provide a selected net optical path length difference between first and second beam components.

Optionally, the air gap phase control element (620) shown in FIG. 3 may be replaced with a dielectric phase control element comprising at least one dielectric layer in optical communication with partially reflective optical coating (270). Dielectric phase control element has an internal end, an external end and a selected optical path length. Dielectric phase control elements of the present invention may be any dielectric material including but not limited to glass, fussed silica, quartz, sapphire, germanium, zinc selenide, $Ta_2O_5$, $SiO_2$, $HfO_2$, $TiO_2$, $MgF_2$, $CaF_2$ and $Nb_2O_5$. Use of low expansion materials for dielectric phase control elements of the present invention is preferred to achieve a substantially constant and stable optical path length as a function of temperature. In a preferred embodiment, the dielectric cavity layer has ultra smooth and ultra flat internal end and an external end.

Figure 4:
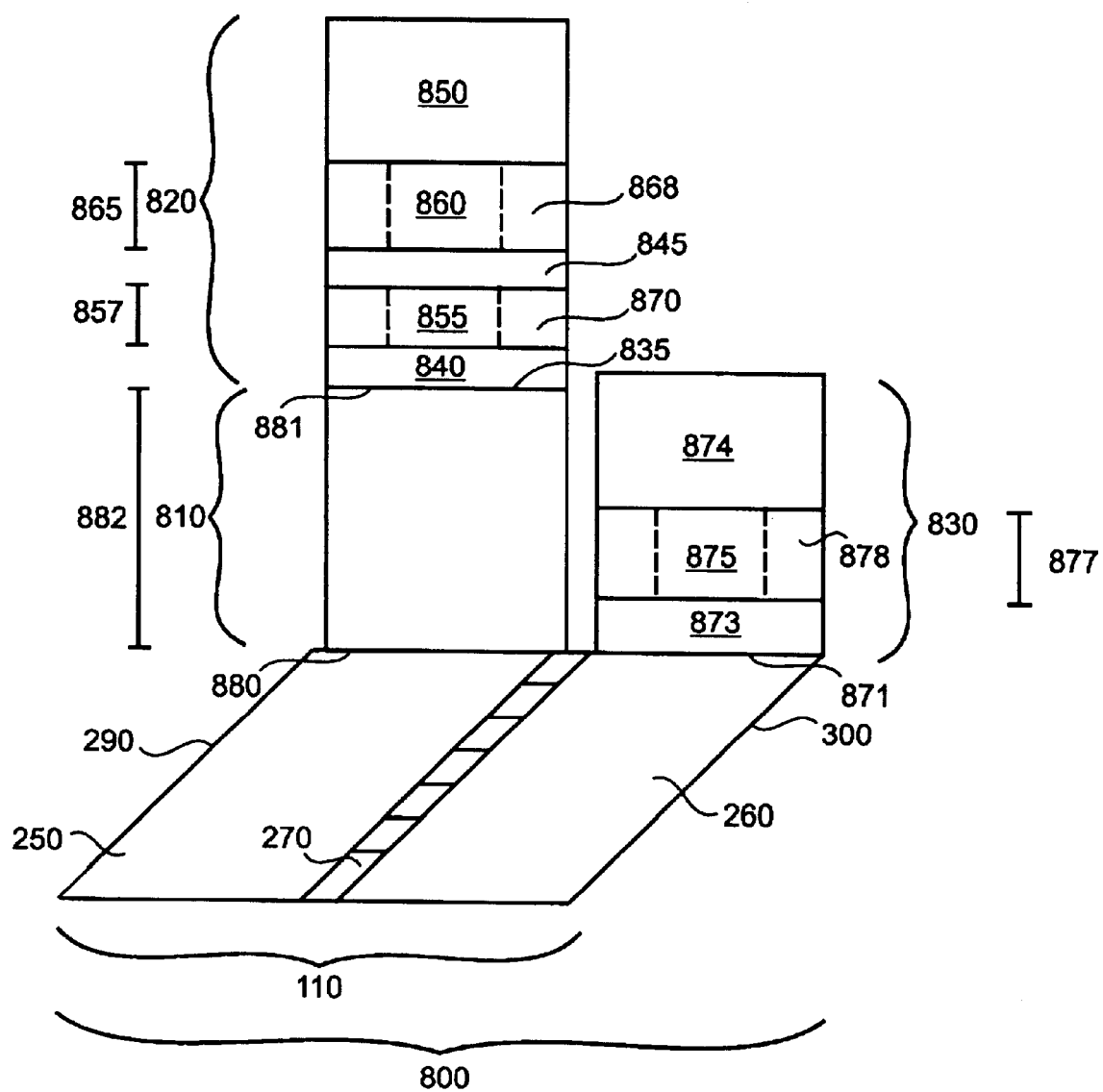
FIG. 4 is a schematic drawing showing a top plan view of an optical interference filter of the present invention having a first GT etalon—air gap phase control element and a second GT etalon phase control element arranged in parallel interferometer geometry.

FIG. 4 illustrates an exemplary embodiment of the optical interference filter of the present invention having an etalon—air gap phase control element, and an etalon phase control element arranged in parallel interferometer geometry. The illustrated optical interference filter (800) comprises beam splitter (110), path length compensation element (810), etalon—air gap phase control element (820) and etalon phase control element (830). Etalon—air gap phase control element (820) has an internal end (835) and comprises front plate (840), internal partially reflective reflector (845) and external reflector (850), each positioned in optical communication with beam splitter (110). Front plate (840) and internal partially reflective reflector (845) are separated by air gap (855) having a selected optical path length (857). Internal partially reflective reflector (845) and external reflector (850) are separated by first resonance cavity (860) having a selected optical path length (865). Optionally, etalon—air gap phase control element (820) may further comprise alignment spacers (868) and (870) and for maintaining fixed or selectably adjustable optical path lengths through resonance cavity (860) and air gap (855), respectively. Etalon phase control element (830) has an internal end (871) and comprises partially reflective internal reflector (873) and external reflector (874), each positioned in optical communication with beam splitter (110). Internal reflector (873) and external reflector (874) are located in substantially parallel planes and thereby form a second resonance cavity (875) having a selected optical path length (877). Optionally, etalon phase control element (830) may further comprise alignment spacers (878) for maintaining fixed or selectably adjustable optical path lengths through resonance cavity (875). Path length compensation element (810) has internal end (880), external (881) and a selected optical path length (882) and is operationally coupled to beam splitter (110) and front plate (840). Alternatively, path length compensation element (810) may be directly integrated into etalon—air gap phase shifter (820), wherein front plate (840) and path length compensation element (810) are one material, preferably a single piece of fused silica.

In a preferred embodiment, internal end (835) of etalon—air gap phase control element and internal end (871) of etalon phase control element are located in substantially parallel planes with respect to each other. In a more preferred embodiment, internal end (880) of path length compensation element, internal end (835) of etalon—air gap phase control element and internal end (871) of etalon phase control element are located in substantially parallel planes, highly parallel planes or very highly parallel planes. In the exemplary embodiment shown in FIG. 4, internal end (880) of path length compensation element (810) and internal end (871) of etalon phase control element are located in substantially the same plane.

In a preferred embodiment, internal reflector (873) has an optical thickness substantially equal to the sum of the optical thickness of front plate (840) and internal reflector (845). In addition, optical path length (882) may be selected to provide substantially equivalent optical path lengths of first beam component from partially reflective optical coating (270) to internal end (835) of etalon—air gap phase control element (820) and of second beam component from partially reflective optical coating (270) to internal end (871) of etalon phase control element (830). In a preferred embodiment, first prism element (250), second prism element (260) and path length. compensation element (810) are fused silica and optical path length (882) is selected to provide substantially equivalent optical path lengths of first and second beam components through fused silica. Selection of optical path length (882) to provide equivalent optical path lengths through fused silica provides an optical interference filter (800) having high thermal stability and favorable chromatic dispersion characteristics. As will be clear to those having skill in the art, the present invention includes embodiments having an internal reflector (873) not having a an optical thickness equal to the sum of optical thicknesses of front plate (840) and internal reflector (845). In these embodiments, path length compensation element (810) has an optical path length (882) selected to compensate for this difference in optical thickness and to provide a selected net optical path length difference between first and second beam components. Further, the present invention includes embodiments wherein a path length compensation element of selected optical path length is operationally connected to etalon phase control element (830) to allow selection of the optical path length of second beam component.

In the exemplary embodiment shown in FIG. 4, etalon—air gap phase control element (820) includes a GT etalon and etalon phase control element (830) includes a GT etalon. In this embodiment, external reflectors (850) and (874) are highly reflective. In a preferred embodiment, the reflectivities of partially reflective internal reflectors (845) and (873) are substantially equivalent. In a preferred embodiment comprising an optical interleaver having a −30 dB bandwidth equal to approximately 25 GHz, internal reflectors (845) and (873) have a reflectivities of approximately 3%±1%. In a preferred embodiment comprising an optical interleaver having substantially square-wave transmission bands, first resonance cavity (860), second resonance cavity (875) and air gap (855) have optical path lengths given by the expressions:

$$L_1 \approx L_2$$

$$L_{air} \approx 0.5 \times L$$

where $L_1$ is optical path length (865), $L_2$ is optical path length (877) and $L_{air}$ is optical path length (857). This preferred embodiment also provides an optical interleaver with improved chromatic dispersion characteristics because first and second beam components each propagate through GT etalons having substantially similar reflectivities and optical thicknesses.

Optical interference filters of the present invention operate by multiple beam optical interference of a plurality of beam components that individually undergo phase modification by phase control elements arranged in a parallel geometry. In the exemplary embodiments shown in FIGS. 2, 3, and 4 an incident beam is separated into first and second beam components that are directed through first and second parallel phase control elements. First and second beam components separately undergo selective first and second phase modifications and are coherently combined at a partially reflective optical coating to produce optical interference. The optical path lengths of first and second beam components, therefore, correspond to first and second legs of the interferometer. The precise nature of first and second phase modifications determines the sum of phase components and, hence, the extent of constructive or destructive interference achieved. Accordingly, selection of the appropriate phase modification of first and second beam components establishes the sum of phase components and determines which frequencies of light are transmitted by the optical interference filter of the present invention.

Phase modification provided by first and second external reflectors positioned first and second selected optical path lengths from a partial reflective optical coating may be used to achieved a sinusoidal transmission spectrum characterized by periodic transmission bands. This embodiment comprises a dual beam interferometer having first and second interferometer legs associated with first and second optical paths. Neglecting the affects of reflectance group delay and phase dispersion associated with the reflectors, the phase shift of the interferometer may be expressed by the following equation:

$$\phi_{interferpmeter} = \frac{2 \cdot \pi \cdot n_m}{\lambda} \cdot (L_1 - L_2), \tag{VI}$$

where $\lambda$ is wavelength, n is the refractive index of the material comprising the optical path length difference, $L_1$ is the optical path length of the first beam component, and $L_2$ is the optical path length of the second beam component. The normalized transmitted intensity of such an optical interference filter varies sinusoidially and may be expressed in terms of wavelength by the equation:

$$\frac{I_{trans}}{I_{incident}} = \sin^2\left(\frac{2 \cdot \pi \cdot n}{\lambda} \cdot (L_1 - L_2)\right), \tag{VII}$$

where $I_{trans}$ is the intensity of the light transmitted by the optical interference filter and $I_{incident}$ is the intensity of the incident light.

Phase modification provided by incorporating one or more GT etalon phase control elements into first or second legs of the interferometer may provide a non-sinusoidal transmission profile. The net phase shift achieved in these embodiments may be conceptualized as the sum of a first phase shift associated with one or more GT etalons and second phase shift associated with the net optical path length difference between first and second beam component optical path lengths (i.e. first and second legs of the interferometer). Transmission spectra corresponding to these optical interleavers vary with the optical path length difference between first and second beam components, the optical path of the etalon resonance cavities and the reflectivity of partially reflective etalon reflectors.

Phase modification provided by a first air gap phase control element and a second GT etalon phase control element, as illustrated in FIG. 3, provides a transmission spectrum characterized by a more complex, non-sinusoidal function. The transmission characteristics of this embodiment are derived by evaluating the sum of the phase shift provided by the difference between first and second beam optical path lengths and the phase shift provided by the GT etalon. As described above, the phase shift provided by the difference between first and second beam optical paths ($\phi_{dualbeam}$) may be expressed in terms of wavelength by the equation:

$$\phi_{dualbeam} = \frac{2 \cdot \pi \cdot n_m}{\lambda} \cdot (L_1 - L_2), \tag{VIII}$$

where $\phi_{dualbeam}$ is the phase shift associated with a dual beam interferometer having unequal optical path length legs, n is the refractive index of the material comprising the optical path length difference, x is wavelength, $L_1$ is the optical path length of the first beam component, and $L_2$ is the optical path length of the second beam component. The phase shift associated with the GT etalon ($\phi_{GT}$) may be expressed in terms of wavelength by the equation:

$$\phi_{GT} = -2\operatorname{Tan}^{-1}\left[\left(\frac{1-\sqrt{R}}{1+\sqrt{R}}\right) \cdot \operatorname{Tan}\left(\frac{2 \cdot \pi \cdot n_{GT} \cdot d}{\lambda}\right)\right], \tag{IX}$$

where $n_{GT}$ is the refractive index of the material comprising the GT etalon resonance cavity, R is the reflectivity of the partially reflective etalon internal reflector, and d is the optical path length of the etalon resonance cavity. The normalized transmitted intensity of the interference filter may be expressed in terms of the sum of phase shifts provide by the dual beam interferometer and the GT etalon:

$$\frac{I_{trans}}{I_{incident}} = \sin^2\left(\phi_{dualbeam} + \frac{\phi_{GT}}{2}\right), \tag{X}$$

Substituting equations VIII and IX into equation X yields the following equation expressing normalized transmitted intensity in terms of wavelength:

$$\frac{I_{trans}}{I_{incident}} = \sin^2\left( \frac{2 \cdot \pi \cdot n_{dualbeam}}{\lambda} \cdot (L_1 - L_2) - \operatorname{Tan}^{-1}\left[\left(\frac{1-\sqrt{R}}{1+\sqrt{R}}\right) \cdot \operatorname{Tan}\left(\frac{2 \cdot \pi \cdot n_{GT} \cdot d}{\lambda}\right)\right] \right) \tag{XI}$$

The derivation above neglects the affects of reflectance group delay and phase dispersion associated with the etalon and air gap reflectors, which may affect transmission band position and free spectral range. As predicted by equation XI, selection of a GT etalon resonance cavity optical path length equal to about two times the difference in the optical path lengths of first and second beam components ($L_1$–$L_2$) results in a summation of phase components providing substantially square-wave transmission bands. Further, selection of a resonance cavity optical path length of about 3 mm, an internal etalon reflector having a reflectivity equal to approximately 14% and a optical path length difference ($L_1$–$L_2$) of 1.5 mm provides a 100 GHZ free spectral range optical interference filter having square transmission channels with a −30 dB bandwidth equal to approximately 25 GHz, particularly useful for demultiplexing optical signals corresponding to transmission channels of the ITU frequency standard.

Optical interleavers of the present invention having improved square-wave shaped transmission bands an optimal chromatic dispersion characteristics may be provided by employing an a GT etalon—air gap phase control elements and an etalon phase control element arranged in a parallel interferometer optical arrangement, as shown in FIG. 4. The transmission characteristics of this embodiment are derived by evaluating the sum of the phase shifts provided by the difference between first and second beam optical path lengths ($\phi_{dualbeam}$) and the phase shifts provided by first and second GT etalons ($\phi_{GT1}$ & $\phi_{GT2}$):

$$\frac{I_{trans}}{I_{incident}} = \sin^2\left(\phi_{dualbeam} + \frac{\phi GT1}{2} - \frac{\phi GT2}{2}\right), \tag{XII}$$

Substitution of equations VIII and IX into equation XII yields the following equation expressing the normalized transmitted intensity in terms of wavelength:

$$\frac{I_{trans}}{I_{incident}} = \text{Sin}^2 \left( \begin{array}{l} \frac{2\cdot\pi\cdot n_{dualbeam}}{\lambda}\cdot(L_1-L_2) - \text{Tan}^{-1}\left[\left(\frac{1-\sqrt{R}}{1+\sqrt{R}}\right)\cdot\text{Tan}\left(\frac{2\cdot\pi\cdot n_{GT1}\cdot d_1}{\lambda}\right)\right] + \\ \text{Tan}^{-1}\left[\left(\frac{1-\sqrt{R}}{1+\sqrt{R}}\right)\cdot\text{Tan}\left(\frac{2\cdot\pi\cdot n_{GT2}\cdot d_2}{\lambda}\right)\right] \end{array} \right) \quad \text{(XIII)}$$

where $d_1$ is the optical path length of the first resonance cavity, $n_{GT1}$ is the refractive index of the material comprising the first resonance cavity, $R_1$ is the reflectivity of the internal reflector of the first GT etalon, $d_2$ is the optical path length of the second resonance cavity, $n_{GT2}$ is the refractive index of the material comprising the second resonance cavity, and $R_2$ is the reflectivity of the internal reflector of the second GT etalon. The derivation above neglects the affects of reflectance group delay and phase dispersion associated with the etalon and air gap reflectors, which may affect transmission band position and free spectral range. As predicted by equation XIII, selection of a first GT etalon resonance cavity optical path length equal to two times the difference in optical path lengths of first and second beam components ($L_1$–$L_2$) and a second GT etalon resonance cavity optical path length slightly shifted from the first resonance cavity optical path length, ($d_2$=$d_1$+$\delta$), results in a summation of phase components providing substantially square-wave transmission bands. Further, selection of a first resonance cavity optical path length of about 1.5 mm, a second resonance cavity optical path length of about 1.5 mm, internal etalon reflectors having a reflectivity equal to approximately 3% and a optical path length difference ($L_1$–$L_2$) of 0.75 mm provides a 100 GHZ free spectral range optical interference filters having square transmission channels with a −30 dB bandwidth equal to approximately 25 GHz, particularly useful for demultiplexing optical signals corresponding to transmission channels of the ITU frequency standard.

The optical interference filters of the present invention may be used to filter any light source including but not limited to (1) continuous sources such as solid-state lasers, semiconductor lasers, gas phase lasers, helium—neon lasers, atomic and molecular discharge lamps and (2) pulsed sources such as pulsed gas phase lasers, pulsed or modulated solid-state semiconductor lasers and pulsed lamps. The optical path lengths of incident beam and beam components of the present invention may be selectively adjusted by variation of the angle of incidence of the incident beam. Accordingly, the resonance frequencies and free spectral range of the interference filters of the present invention may be adjusted by selection of the appropriate angle of incidence of the incident light beam by techniques well known in the art of optical filtering.

Figure 5:
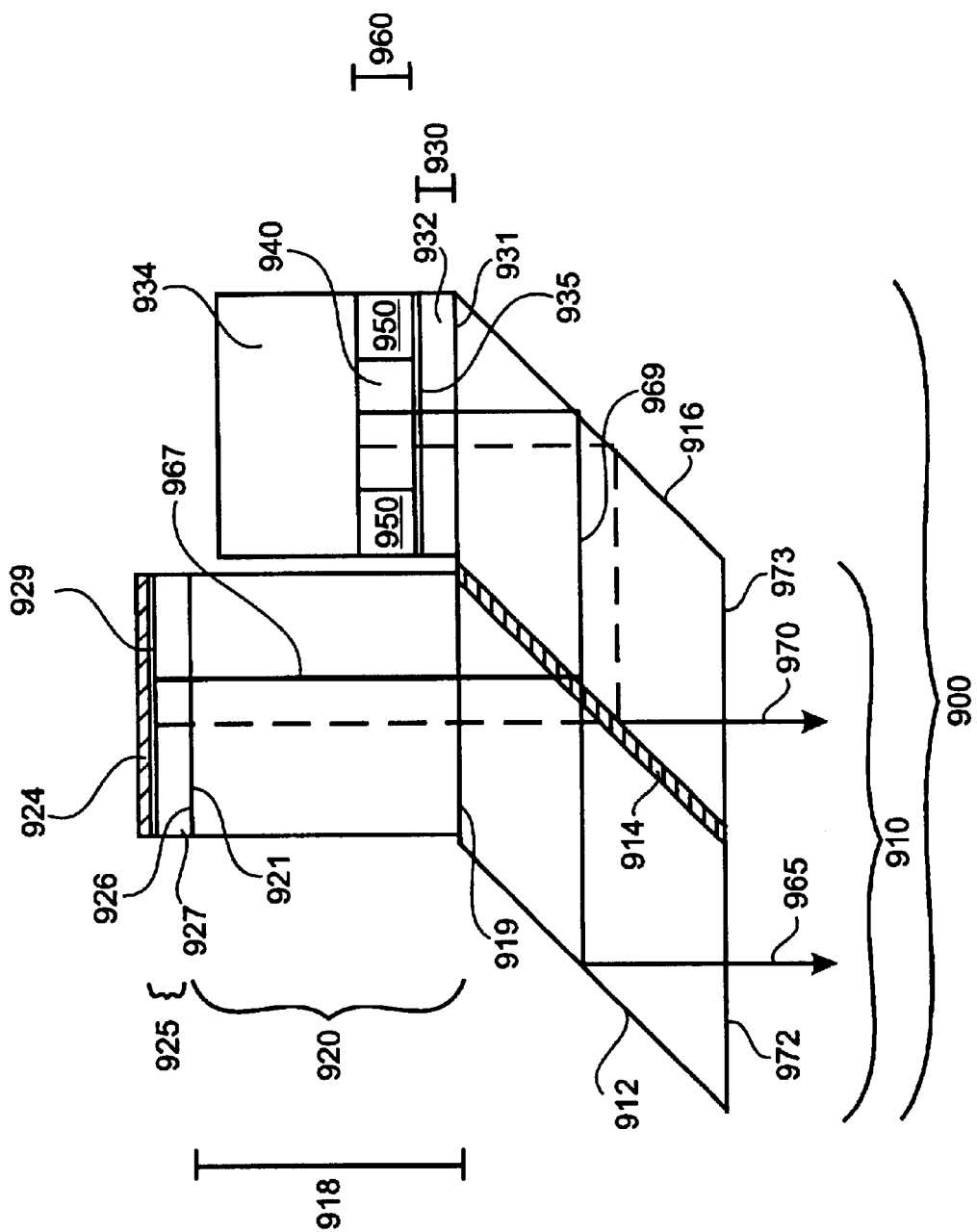
FIG. 5 is a schematic drawing showing a top plan view of an athermal retarder of the present invention having a first waveplate polarization shifter and second waveplate polarization shifter arranged in a parallel geometry. Also shown are the optical paths of the incident beam, first beam component, second beam component and the output beam.

The present invention also comprises single order and multiple order wave retarders having high thermal stability. FIG. 5 illustrates an exemplary embodiment of the invention comprising an athermal retarder capable of functioning as a multiple order wave retarder. The illustrated athermal retarder (900) comprises polarization selective beam splitter (910), path length compensation element (920), first waveplate polarization shifter (925), second waveplate polarization shifter (930) and external reflector (934). Beam splitter (910) has a reflective surface (912) capable of providing total internal reflection, a polarization selective optical coating (914) and reflective surface (916) capable of providing total internal reflection, each located in substantially parallel planes with respect to each other. Beam splitter (910) also has beam input surface (972) and beam output surface (973), preferably each having a slight wedge. Optionally, beam input surface (972) and beam output surface (973) have antireflection coatings, preferably providing a reflectivity of less than 0.05%. Path length compensation element has a selected optical path length (918), internal end (919) and an external end (921) and is operationally coupled to polarization selective beam splitter (910) and first waveplate polarization shifter (925). First waveplate polarization shifter (925) has an internal end (926) and comprises front plate (927), wave retardation plate (929) and highly reflective external reflector (924), operationally coupled to each other and in optical communication with polarization selective optical coating (914). Second waveplate polarization shifter (930) has an internal end (931) and comprises front plate (932) and wave retardation plate (935), operationally coupled to each other and in optical communication with polarization selective beam splitter (914). External reflector (934) and wave retardation plate (935) are located in substantially parallel planes and are separated by air gap (940) having a selected optical path length (960). In a preferred embodiment, front plate (927) and front plate (932) are both fused silica and have the same optical path length. Optionally, athermal retarder (900) further comprises alignment spacers (950) capable of maintaining a substantially fixed or selectably adjustable optical path length (960).

In a preferred embodiment, internal end (926) of first waveplate polarization shifter and internal end (931) of second waveplate polarization shifter are located in substantially parallel planes with respect to each other. In a more preferred embodiment, internal end (919) of path length compensation element, internal end (931) first waveplate polarization shifter and internal end (926) of second waveplate polarization shifter are located in substantially parallel planes, highly parallel planes or very highly parallel planes. In the exemplary embodiment shown in FIG. 5, internal end (919) of path length compensation element (920) and internal end (931) of first waveplate polarization shifter are located in substantially the same plane.

The optical paths of incident beam (965), first polarization beam component (967), second polarization beam component (969) and output beam (970) are also shown in FIG. 5. Linearly polarized incident light beam (965) is directed at beam input surface (972) of beam splitter (910) and is reflected at reflective surface (912). Reflected incident beam (965) interacts with polarization selective optical coating (914) where it is divided into first polarization beam component (967) and second polarization beam component (969). In a preferred embodiment, polarization selective optical coating (914) is configured to reflect s-polarization light and transmit p-polarization. In a more preferred embodiment, polarization selective optical coating (914) is configured to transmit 300 times more p-polarization light than s-polarized light and to reflect 300 times more s-polarized light than p-polarized light. In this preferred embodiment, therefore, first polarization beam component (967) is substantially s-polarized light and second polarization beam component (969) is substantially p-polarized light.

First polarization beam component (967) is directed through path length compensation element (920) and onto first waveplate polarization shifter wherein it undergoes a change in polarization state and is reflected back to polarization selective optical coating (914). In a preferred embodiment wherein wave retardation plate (924) is a quarter waveplate, first polarization beam under goes a change in polarization state from s-polarization state to p-polarization state and, therefore, is substantially transmitted through polarization selected optical coating (914). Second beam component (969) passes through polarization selective optical coating (914) and is reflected by reflective surface (916). Second polarization beam component (969) passes through second waveplate polarization shifter (930) wherein it undergoes a change in polarization state, passes through air gap (940) and is reflected back to polarization selective optical coating (914) by external reflector (934). In a preferred embodiment wherein wave retardation plate (935) is a quarter waveplate, second beam component (969) under goes a change in polarization from p-polarization state to s-polarization state upon its round trip through second waveplate polarization shifter (930) and air gap (940). As a result of this change in polarization, reflected second beam component (969) is substantially reflected by polarization selected optical coating (914). Transmitted first polarization beam component and reflected second polarization beam component are combined at polarization selective optical coating (914) and exit beam splitter (910) through beam output surface (973). As a result of propagating through air gap (940) second beam component under goes a selected phase shift, which the first beam component does not under go. As a result, incident plane polarized light passing through wave retarder (900) is converted into elliptically polarized light with a periodicity dependent on the frequency of the incident light beam. Accordingly, wave retarders of the present invention are capable of generating light having a selected elliptical polarization state, which varies systematically as a function of frequency.

Path length compensation element (920) may be of any refractive index and optical path length. In a preferred embodiment, optical path length (918) is selected to provide substantial equivalent optical path lengths of the first beam component from polarization selective coating (914) to wave retardation plate (929) and of the second beam component from polarization selective coating (914) to wave retardation plate (935). In another preferred embodiment, polarization selective beam splitter (910) and path length compensation element (920) are fused silica and optical path length (918) is selected to provide substantially equivalent optical path lengths of first and second beam components through fused silica. Selection of optical path length (918) to provide equivalent path lengths through fused silica provides a wave retarder having high thermal stability and favorable chromatic dispersion characteristics. Specifically, the thermal contraction or expansion experienced by polarization beam splitter (910) and path length control element (920) results in equivalent increases or decreases of the optical path lengths of first and second beam component through fused silica. This optical path length matching scheme provides wave retarders exhibiting a substantially constant phase shift as a function of temperature over the range of about −45° C. to about 85° C. Use of alignment spacers (950) made of a material having a low coefficient of thermal expansion is preferred to achieve good thermal stability. The thermal stability of the athermal retarders of the present invention is in contrast to retardation plates of the prior art which are extremely temperature sensitive at large orders.

Wave retardation plates (929) and (935) may comprise any birefringent element capable of providing a selected change in polarization state. Preferred wave retardation plates include but are not limited to crystal quartz, $MgF_2$, $LiNb_2O_3$, mica and polymer materials. In a preferred embodiment, wave retardation plates (929) and (935) have an order given by the expression:

$$\text{order}=n+0.25, n=0,1,2,3,\ldots$$

or $$\text{order}=n+0.75, n=0,1,2,3\ldots$$

where n is a whole number.

The present invention provides devices, device components and methods for optical signal processing, especially useful for filtering optical signal streams corresponding to channels of the ITU frequency standard. As will be recognizable to those having skill in the art, all devices, device elements and device equivalents are within the scope of the present invention. In addition, the methods and devices of the present invention provide optical interleavers with minimized angular recombination distortion and capable of precise optical path length matching. The invention provides exemplary methods of making optical interference filters that provide high piece-to-piece reproducibility. These and other variations of the present optical interference filters and optical interleavers are within the spirit and scope of the claimed invention. Accordingly, it must be understood that the detailed description, preferred embodiments, drawings and examples set forth here are intended as illustrative only and in no way represent a limitation on the scope of the invention.

EXAMPLES

Example 1

Optical Inteleaver Frequency Matched to Even or Odd Transmission Channels of a Frequency Standard With 50 GHz Transmission Channels Having a Parallel GT Etalon Phase Control Element and an Air Gap Phase Control Element The ability of optical interference filters of the present invention to function as a channel dropping or channel adding optical interleaver was evaluated by numerical modeling methods. Specifically, it is a goal of the present invention to provide optical interference filters capable of isolating either even or odd transmission channels of a given frequency standard having narrowly spaced transmission channels. Further, it is a goal of the present invention to provide optical interference filters capable of transmitting substantially all light having frequencies corresponding to a selected transmission channel or series of transmission channels and capable of substantially preventing transmission of all light having frequencies outside a selected transmission band or series of transmission bands.

To achieve the aforementioned goals, the transmission spectra of an optical interference filter having a parallel interferometer geometry was calculated and compared to an arbitrary frequency standard comprising evenly spaced transmission channels having a 50 GHz width. The optical interference filter evaluated comprises a beam splitter, path length compensation element, first air gap phase control element and a second GT etalon phase control element, arrange as illustrated in FIG. 3. The beam splitter comprises a first fused silica prism element, partial reflective coating and second fused silica prism element. The partially reflective optical coating has a reflectivity of 50%±1% and, therefore, the beam splitter is capable of separating an incident beam into first and second beam components having substantially equivalent intensities. The path length compensation element comprises fused silica and has a selected optical path length such that the optical path length of first beam component from beam splitter to the internal end of the air gap phase control element and the optical path of the second beam from beam splitter to the internal end of the GT etalon are substantially equivalent. Accordingly, the composition and geometry of the optical interference filter provide substantially equal optical path lengths of first and second beam components through fused silica. First fused silica prism element has a reflective surface configured to direct the incident beam onto the partially reflective optical coating via substantially complete total internal reflection. Second fused silica prism element has a reflective surface configured to direct the second beam component onto the internal end of the GT etalon phase control element via total internal reflection. Optionally, the reflective surface of second fused silica prism element is coated with a phase correction surface coating comprising a half wave $Ta_2O_5$ coating at 1550 nm to minimize the change in phase between s and p polarizations during total internal reflection of the second beam component.

Air gap phase control element has a fused silica front plate with an antireflective coating providing for less than 0.05% reflectivity and a highly reflective external reflector having a reflectivity greater than 99.2%. Front plate and highly reflective external reflector of the air gap phase control element are located in parallel planes with deviations from absolute parallelism of less than 0.5 arcsecond and are separated by an air gap having an optical path length of about 1.5 mm.

GT etalon phase control element comprises a partially reflective internal reflector having a reflectivity of 14%±1% and a highly reflective external reflector having a reflectivity greater than 99.2%. Partially reflective internal reflector and highly reflective external reflector of the GT etalon phase control element are located in parallel planes with deviations from absolute parallelism of less than 0.5 arcsecond and are separated by an air gap resonance cavity having an optical path length of about 3 mm. The optical path length selected provides a GT etalon with a free spectral range equal to about 50 GHz. Front plate and partially reflective internal reflector have the same thickness within 0.0003 mm and are located in parallel planes with a deviation from absolute parallelism of 1 arcsecond or less.

Figure 6:
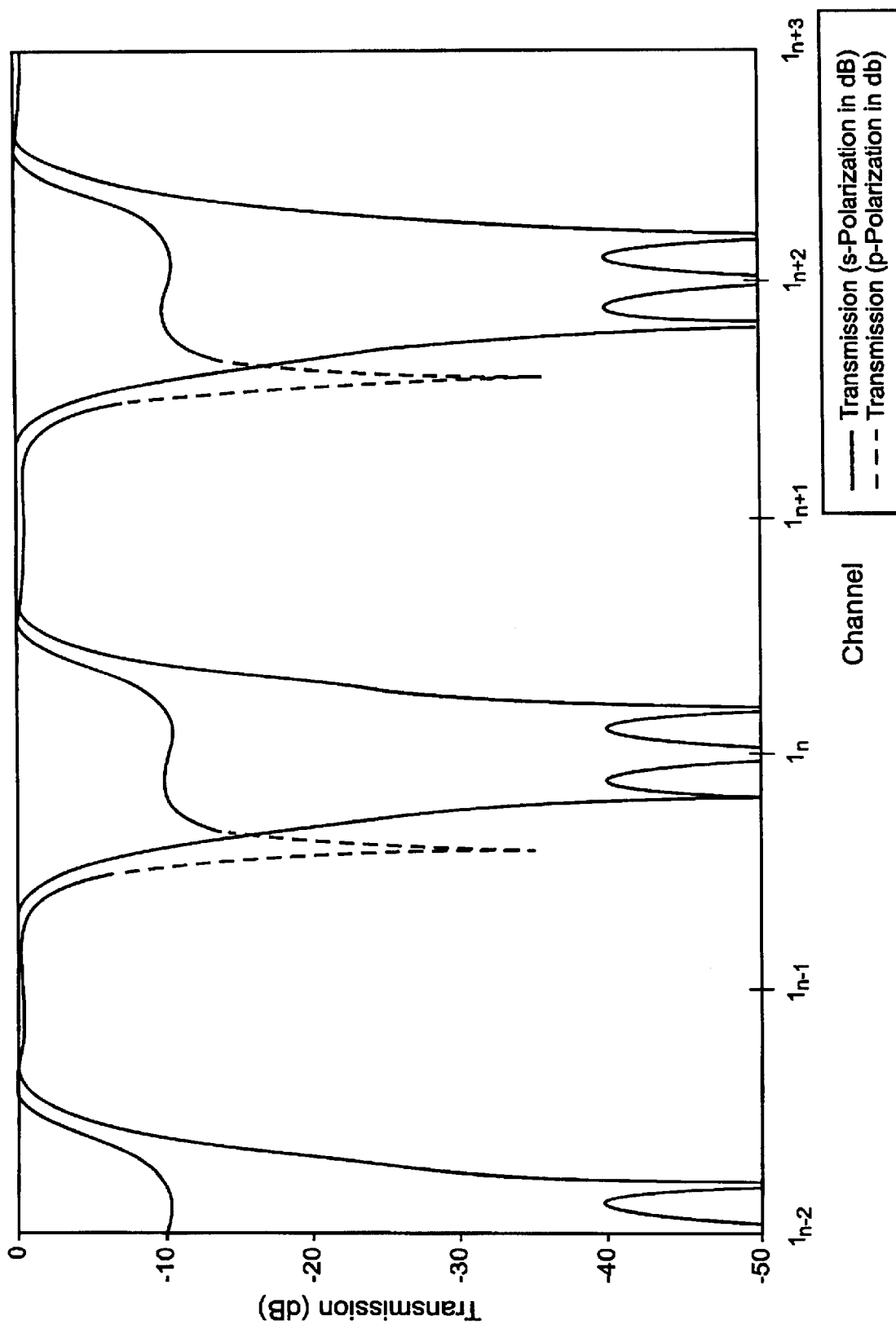
FIG. 6 shows a transmission spectrum, in units of dB, of an optical interference filter of the present invention having a first air gap phase control element and a second GT etalon phase control element arranged in parallel interferometer geometry. The transmission spectrum shown in FIG. 6 corresponds to a beam splitter without a phase correcting surface.
Figure 7:
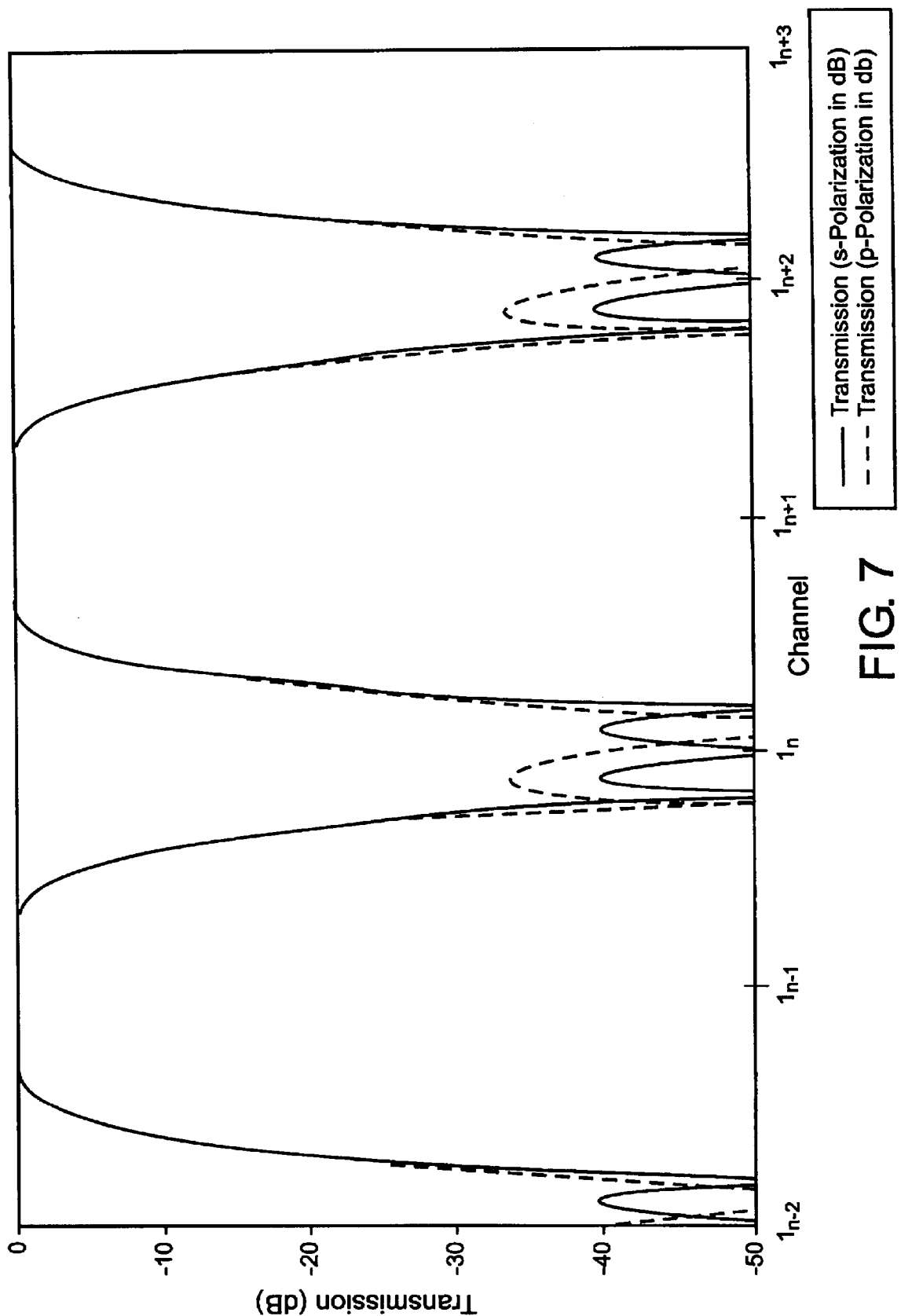
FIG. 7 shows a transmission spectrum, in units of dB, of an optical interference filter of the present invention having a first air gap phase control element and a second GT etalon phase control element arranged in parallel interferometer geometry. The transmission spectrum shown in FIG. 7 corresponds to a beam splitter with a phase correcting surface.

FIGS. 6 and 7 show transmission spectra, for linearly polarized light, calculated for the exemplary optical interference filters evaluated. The solid lines in FIGS. 6 and 7 represent s-polarized light and the dotted lines represent p-polarized light. FIG. 6 shows the transmission spectrum of an optical interference filter without a phase correction surface coating on the reflective surface of the second prism element. As illustrated in FIG. 6, the optical interference filter has a 100 GHz free spectral range and a −30 dB bandwidth of approximately 25 GHz. Taking into consideration the logarithmic scale on the y-axis, the transmission profile of s-polarized light provides substantially square wave transmission bands. Substantial deviations from a square-wave form, however, are clearly observable in the transmission spectrum of light having a p—polarization state. These deviations result from the different effective optical path lengths for s and p polarization states. Different effective optical path lengths for the two polarization states result in an optical arrangement in which light of only one polarization orientation can be precisely tuned for optimal performance at a time. The optical interference filter evaluated in FIG. 6 has been tuned to optimize the filtering of s—polarized light. FIG. 7 shows the transmission spectrum of an optical interference filter having a phase correction surface coating on the reflective surface of the second prism element. As shown in FIG. 7, the optical interference filter evaluated has a free spectral range of 100 GHz and a −30 dB bandwidth of approximately 25 GHz. Further, substantially square-wave shaped transmission bands are observed for both s and p polarization orientations due to the presence of the phase correction surface coating.

Figure 8:
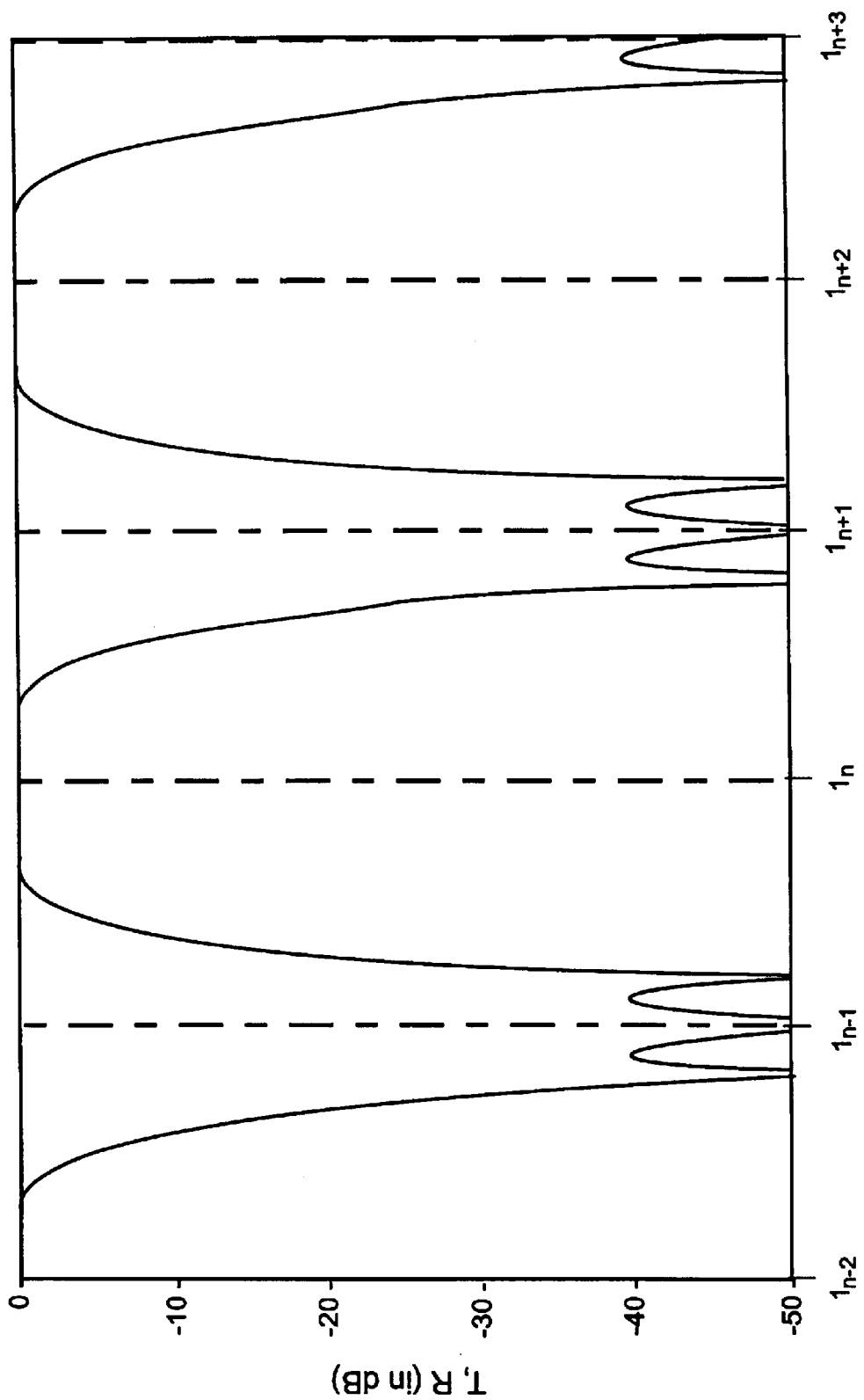
FIG. 8 shows the transmission spectrum, in units of dB, of an optical interference filter configured to function as a channel dropping filter. The solid lines are the transmission spectrum and the dotted lines represent the center frequencies of the transmission channels of a frequency standard having a transmission channel spacing of 50 GHz.
Figure 9:
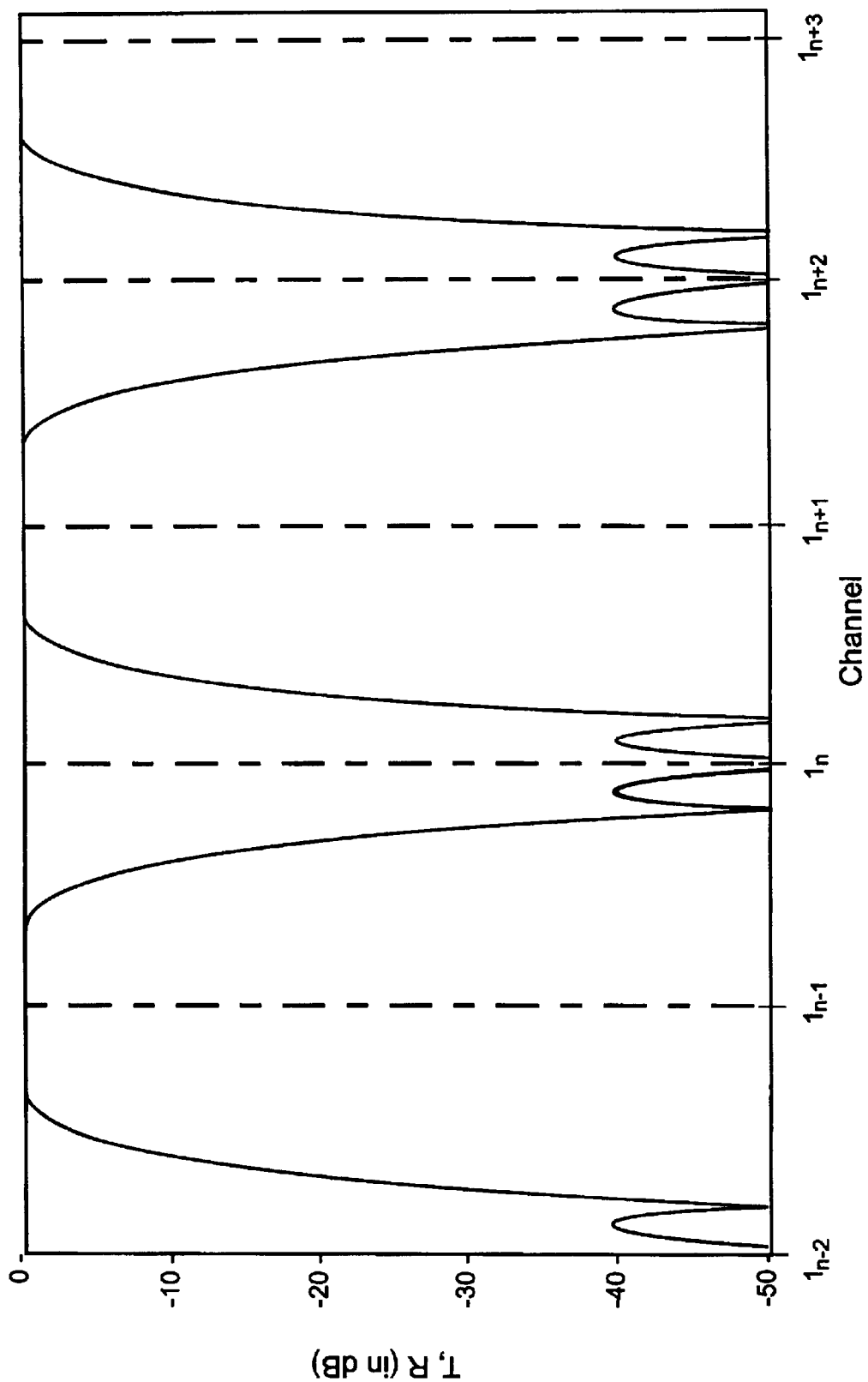
FIG. 9 shows the transmission spectrum, in units of dB, of an optical interference filter configured to function as a channel dropping filter. The solid lines are the transmission spectrum and the dotted lines represent the center frequencies of the transmission channels of a frequency standard having a transmission channel spacing of 50 GHz.

FIGS. 8 and 9 show the transmission spectra of the optical interleaver of this example configured to function as a channel dropping optical filter. In FIGS. 8 and 9, the solid lines are interleaver transmission spectra and the dotted lines represent the center frequencies of the arbitrary frequency standard comprising evenly spaced transmission channels having a 50 GHz width. FIG. 8 shows an optical interleaver having a 100 GHz free spectral range and −30 dB bandwidth of 25 GHz which is capable of transmitting substantially all light of frequency corresponding to selected even channels of the ITU frequency standard defined by the equation:

$$\text{even channels}=2\times n,\ n=0,1,2,3,4\ldots,$$

and capable of substantially preventing all transmission of light corresponding to non-selected odd channels of the ITU frequency standard defined by the equation:

$$\text{odd channels}=2\times n+1,\ n=0,1,2,3,4\ldots$$

FIG. 9 shows an optical interleaver having a 100 GHz free spectral range and −30 dB bandwidth of 25 GHz configured to pass selected odd channels and prevent transmission of light corresponding to non-selected even channels of the ITU frequency standard. Switching between even channel passing and odd channel passing is accomplished by angle tuning methods well known in the art of optical engineering. In a preferred embodiment, the optical interference filter is rotated with respect to the axis of propagation of the incident beam to achieve a change in the angle of incidence. Alternatively, the interference filter may be angle tuned by varying the angle of incidence by rotating the axis of propagation of the incident light beam with respect to the plane comprising the beam input surface. Switching from even channel dropping to odd channel dropping functionality via angle tuning methods, however, does influence the free spectral range of the optical interference filters of the present invention.

Example 2

Method of Fabricating Optical Interference Filters Having a Parallel Interferometer Geometry The present invention includes optical interference filters that can be manufactured by convention fabrication methods with reduced vertical and horizontal recombination distortion. In addition, the optical interference filters of the present invention are able to be manufactured via conventional fabrication methods with a great degree of precision with respect to the selected optical path length of the first beam component and the selected optical path length of the second beam component. The methods described below correspond to preferred methods of making the optical interference filters illustrated in FIGS. 2, 3 and 4.

A preferred method of making a beam splitter having a parallel reflector geometry comprises the steps of: (1) simultaneously polishing the reflective surface and first prism coupling surface of first prism element to achieve ultra flat and ultra smooth, substantially parallel surfaces, (2) simultaneously polishing the reflective surface and second prism coupling surface of second prism element to achieve ultra flat and ultra smooth parallel, substantially parallel surfaces, (3) coating either the first prism coupling surface or the second prism coupling surface with a partially reflective coating via deposition methods, preferably ion beam sputtering techniques, (4) coating the reflective surface of the second prism element with a phase correction coating via deposition methods, preferably ion beam sputtering techniques (5) operationally coupling first and second prism coupling surface, preferably using optical contact bonding, (6) polishing first and second phase control element interfaces at nominally 45 degrees, (7) polishing first and second beam coupling surface, optionally providing a wedge surface with respect to the plane comprising first and second phase control element interfaces, (8) coating first and second beam coupling surface with an antireflective coating via deposition methods, preferably ion beam sputtering techniques, (9) sawing to selected width dimension and (10) measuring the optical path length difference of first and second components of a tunable laser beam that are separated at the partially reflective optical coating and exit first and second phase control element interfaces, respectively.

A preferred method of coupling a path length compensation element to a beam splitter having a parallel reflector geometry to fabricate an optical interference filter having a parallel interferometer arrangement comprises the steps of: (1) simultaneously polishing internal and external ends of the path length compensation element to achieve ultra flat, ultra smooth parallel ends and a selected optical path length, (2) measuring the optical path length through the path length compensation element as a solid etalon using a tunable laser, (3) if necessary re-polishing internal and external ends to achieve the selected optical path length, (4) sawing to selected width dimension and (5) operationally coupling the path length compensation element to the first or second phase control element interface, preferably using optical contact bonding.

A preferred method of coupling first and second phase control elements to a beam splitter having a parallel reflector geometry to fabricate an optical interference filter having a parallel interferometer arrangement comprises the steps of: (1) polishing the internal end of the first phase control element to achieve an ultra flat and ultra smooth surface, (2) polishing the internal end of the second phase control element to achieve an ultra flat and ultra smooth surface, (3) operationally coupling the first phase control element to either external end of the path length compensation element, preferably using optical contact bonding and (4) operationally coupling the second phase control element to the second phase control element interface, preferably using optical contact bonding.

All references cited in this application are hereby incorporated in their entireties by reference herein to the extent that they are not inconsistent with the disclosure in this application. It will be apparent to one of ordinary skill in the art that methods, devices, device elements, materials, procedures and techniques other than those specifically described herein can be applied to the practice of the invention as broadly disclosed herein without resort to undue experimentation. All art-known functional equivalents of methods, devices, device elements, materials, procedures and techniques specifically described herein are intended to be encompassed by this invention.

I claim:

1. An optical interference filter comprising:
   a) a beam splitter for separating an incident optical beam into a first beam component and a second beam component;
   b) a first phase control element in optical communication with the beam splitter for receiving the first beam component, the phase control element comprising a first external reflector and having an internal end positioned a selected first optical path length from the beam splitter, wherein the first phase control element modifies the phase of the first beam component and wherein the first beam component is substantially reflected by the first phase control element; and
   c) a second phase control element in optical communication with the beam splitter for receiving the second beam component, the second phase control element comprising a second reflector and having an internal end positioned a selected second optical path length from the beam splitter, wherein the second phase control element modifies the phase of the second beam component and the second beam component is substantially reflected by the second phase control element;

wherein the internal end of the first phase control element and the internal end of the second phase control element are located in substantially parallel planes with respect to one another, and wherein the optical arrangement is constructed and arranged such that the reflected first beam component and the reflected second beam component are coherently combined and undergo optical interference.

2. The optical interference filter of claim 1 wherein the first phase control element comprises an air gap phase control element.

3. The optical interference filter of claim 2 wherein the air gap phase control element further comprises a front plate, wherein the front plate and the first external reflector are separated by an air gap of selected optical path length and are located in substantially parallel planes with respect to the internal end of the first phase control element.

4. The optical interference filter of claim 3 wherein the air gap phase control element further comprises at least one spacer positioned between the front plate and the air gap reflector, wherein said spacer maintains a substantially constant optical path length through said air gap.

5. The optical interference filter of claim 2 wherein the air gap has an optical path length selected from the range of about 0.5 mm to about 15 mm.

6. The optical interference filter of claim 3 wherein said the optical path length through said air gap is selectably adjustable.

7. The optical interference filter of claim 6 wherein said air gap phase control element further comprise a piezoelectric element located between the front plate and the first external reflector.

8. The optical interference filter of claim 6 wherein said air gap phase control element further comprises an electrooptic modulator located between the front plate and the first external reflector.

9. The optical interference filter of claim 2 wherein the second phase control element comprises an etalon optical filter.

10. The optical interference filter of claim 1 wherein the first phase control element comprises a dielectric phase control element.

11. The optical interference filter of claim 10 wherein the dielectric phase control element further comprises a dielectric layer, said dielectric layer having an internal end and an external end, wherein the internal end of the dielectric layer and the first external reflector are separated by a selected optical path length and are located in substantially parallel planes with respect to the internal end of the first phase control element.

12. The optical interference filter of claim 1 wherein the second phase control element is an etalon optical filter.

13. The optical interference filter of claim 12 wherein the etalon optical filter further comprises a partially reflective internal reflector, wherein the partially reflective internal reflector and the second external reflector are located in substantially parallel planes with respect to the internal end of the second phase control element and thereby form a resonance cavity between the partially reflective internal reflector and the second external reflector having a selected optical path length.

14. The optical interference filter of claim 13 wherein the etalon optical filter is a Gires—Tournois etalon, wherein the second external reflector is highly reflective.

15. The optical interference filter of claim 14 wherein the resonance cavity has an optical path length selected from the range of about 100 nm to about 15 mm.

16. The optical interference filter of claim 13 wherein the internal end of said second phase control element is the partially reflective internal reflector.

17. The optical interference filter of claim 13 wherein the resonance cavity is an air gap cavity.

18. The optical interference filter of claim 17 wherein the optical path length of the air gap cavity is selectably adjustable.

19. The optical interference filter of claim 18 wherein said etalon optical filter further comprises a piezoelectric element located between the partially reflective internal reflector and the second external reflector.

20. The optical interference filter of claim 18 wherein said etalon optical filter further comprises an electrooptic modulator located between the partially reflective internal reflector and the second external reflector.

21. The optical interference filter of claim 13 wherein the resonance cavity is a dielectric layer cavity.

22. The optical interference filter of claim 12 wherein the etalon optical filter has a free spectral range selected from the range of about 10 GHz to about 200 GHz.

23. The optical interference filter of claim 12 wherein the first phase control element comprises an etalon optical filter.

24. The optical interference filter of claim 1 wherein the beam splitter comprises a partially reflective optical coating and a first reflective surface, wherein the partially reflective optical coating and the first reflective surface are located in substantially parallel planes.

25. The optical interference filter of claim 24 wherein the beam splitter further comprises a second reflective surface, wherein the second reflective surface and the first reflective surface are located in substantially parallel planes and wherein the partial reflective coating is located between the first reflective surface and the second reflective surface.

26. The optical interference filter of claim 25 wherein the bean splitter further comprises a first prism element and a second prism element, the first prism element having the first reflective surface and a first beam coupling surface and the second prism element having the second reflective surface and a second beam coupling surface; wherein the first beam coupling surface and the second beam coupling surface are located in substantially parallel planes with respect to each other, wherein the first prism element and the second prism element are operationally coupled at an optical interface and wherein the partially reflective optical coating is located at the optical interface.

27. The optical interference filter of claim 26 wherein the first and second beam coupling surfaces have antireflective surface coatings.

28. The optical interference filter of claim 26 wherein the first and second beam coupling surfaces are slightly wedged shaped.

29. The optical interference filter of claim 26 wherein the first prism element and the second prism element are fused silica.

30. The optical interference filter of claim 25 wherein the second reflective surface has a phase correction surface coating.

31. The optical inference filter of claim 30 wherein the phase correction surface comprises at least one thin film.

32. The optical interference filter of claim 24 wherein the partially reflective optical coating comprises a sequence of alternating high index of refraction and low index of refraction thin film layers.

33. The optical interference filter of claim 32 wherein the thin film layers are selected from the group consisting of:
a) $Ta_2O_5$;
b) $SiO_2$;
c) $HfO_2$;
d) $TiO_2$;
e) $MgF_2$;
f) $CaF_2$;
g) $Nb_2O_5$; and
h) Si.

34. The optical interference filter of claim 24 wherein the partially reflective optical coating comprises at least one thin metallic layer.

35. The optical interference filter of claim 1 wherein the beam splitter is a 50/50 beam splitter.

36. The optical interference filter of claim 1 wherein the difference between the optical path length from the beam splitter to the first external reflector and the optical path length from the beam splitter to the second external reflector is selectable.

37. The optical interference filter of claim 1 further comprising a path length compensation element in optical communication with the beam splitter and the first phase control element, the path length compensation element having a selected optical path length and an internal end.

38. The optical interference filter of claim 37 wherein the internal end of the first phase control element and the internal end of the path length compensation element are located in substantially parallel planes.

39. The optical interference filter of claim 38 wherein the internal end of the path length compensation element and the internal end of the second phase control element are located in substantially the same plane.

40. The optical interference filter of claim 37 wherein the internal end of the second phase control element and the internal end of the path length compensation element are located in substantially parallel planes.

41. The optical interference filter of claim 40 wherein the path length compensation element is located between the first phase control element and the beam splitter.

42. The optical interference filter of claim 37 wherein the path length compensation element is fused silica.

43. The optical interference filter of claim 37 wherein the optical path length of said path length compensation element is selected to provide equal optical path lengths of first and second beam components through fused silica.

44. The optical interference filter of claim 1 comprising a tunable optical filter.

45. The optical interference filter of claim 1 comprising an optical interleaver.

46. An optical interference filter comprising:
a) a beam splitter for separating an incident optical beam into a first beam component and a second beam component;
b) an air gap phase controller in optical communication with the beam splitter for receiving the first beam component and having an internal end positioned a selected first optical path length from the beam splitter, the air gap phase control element comprising a first external reflector and a front plate, wherein the front plate and the first external reflector are separated by an air gap of selected optical path length and are located in substantially parallel planes with respect to the internal end of the air gap phase control element, wherein the air gap phase control element modifies the phase of the first beam component and wherein the first beam component is substantially reflected by the air gap phase control element;

c) a path length compensation element in optical communication with the beam splitter and the air gap phase control element, the path length compensation element having a selected optical path length and an internal end, wherein the path length compensation element is located between the beam splitter and the air gap phase control element; and d) an etalon phase control element in optical communication with the beam splitter for receiving the second beam component and having an internal end positioned a selected second optical path length from the beam splitter, the etalon optical filter comprising a second external reflector and a partially reflective internal reflector, wherein the partially reflective internal reflector and the second external reflector are located in substantially parallel planes with respect to the internal end of the second phase control element and thereby form a resonance cavity between the partially reflective reflector and the second external reflector having a selected optical path length, wherein the etalon phase control element modifies the phase of the second beam component and the second beam component is substantially reflected by the etalon phase control element;

wherein the internal end of the air gap phase control element and the internal end of the etalon phase control element are located in substantially parallel planes with respect to one another, and wherein the optical arrangement is constructed and arranged such that the reflected first beam component and the reflected second beam component are coherently combined and undergo optical interference.

47. The optical interference filter of claim 46 wherein the optical path length of the etalon resonance cavity is about two times the optical path length of the air gap.

48. The optical interference filter of claim 46 wherein the internal reflector has a reflectivity of about 14%.

49. The optical interference filter of claim 46 wherein the path length compensation element is an integral part of the air gap phase control element.

50. An athermal wave retarder comprising:

a) a polarization selective beam splitter for separating an incident optical beam into a first beam component having a first polarization state and a second beam component having a second polarization state, wherein the first polarization state is different from the second polarization state;

b) a first waveplate polarization shifter in optical communication with the beam splitter for receiving the first beam component and having an internal end positioned a selected first optical path length from the beam splitter, the first waveplate polarization shifter comprising a first front plate, a first wave retardation plate and a first external reflector, wherein the first waveplate polarization shifter modifies the polarization state of the first beam component and wherein the first beam component is substantially reflected by the first waveplate polarization shifter; and c) a second waveplate polarization shifter in optical communication with the beam splitter for receiving the second beam component and having an internal end positioned a selected second optical path length from the beam splitter, the second waveplate polarization shifter comprising a second front plate, a second wave retardation plate, air gap and a second external reflector, wherein the second wave plate and the second external reflector are separated by the air gap, wherein the second waveplate polarization shifter modifies the polarization state of the first beam component and wherein the first beam component is substantially reflected by the second waveplate polarization shifter;

wherein the internal end of the first waveplate polarization shifter and the internal end of the second waveplate polarization shifter are located in substantially parallel planes with respect to one another.

51. The optical interference filter of claim 50 comprising an optical interleaver.

52. A method of making an optical interference filter comprising the steps:

a) simultaneously polishing two sides of a first prism element thereby forming a first prism coupling surface and a first reflective surface located in substantially parallel planes with respect to each other;

b) simultaneously polishing two sides of a second prism element thereby forming a second prism coupling surface and a second reflective surface located in substantially parallel planes with respect to each other;

c) depositing a thin film optical coating on the first prism coupling surface second, prism coupling surface or both;

d) coupling the first and second prism elements, wherein the first prism coupling surface of the first prism element is operationally coupled to the second prism coupling surface of the second prism element thereby creating a beam splitter having polished first and second reflective surfaces located in substantially parallel planes, first and second unpolished, phase control element interface surfaces located in substantially parallel planes and an unpolished beam coupling surface;

e) polishing the first and second phase control element interface surfaces of the beam splitter;

f) polishing the beam coupling surface of the beam splitter;

g) simultaneously polishing a two sides of a path length compensation element thereby forming an internal end and an external end located in substantially parallel planes with respect to each other;

h) operationally coupling the internal end of the path length compensation element to the first phase control element interface of the beam splitter;

i) polishing the internal end of a first phase control element and operationally coupling the polished internal end of the first phase control element to the external end of the path length compensation element; and j) polishing the internal end of a second phase control element and coupling the polished internal end of the second phase control element to the polished second phase control element interface surface of the beam splitter.

* * * * *